US010764826B2

(12) United States Patent
Chu et al.

(10) Patent No.: US 10,764,826 B2
(45) Date of Patent: Sep. 1, 2020

(54) LOW POWER WAKEUP IN A WIRELESS NETWORK

(71) Applicant: NXP USA, Inc., Austin, TX (US)

(72) Inventors: Liwen Chu, San Ramon, CA (US); Jinjing Jiang, San Jose, CA (US); Hua Mu, San Jose, CA (US); Hongyuan Zhang, Fremont, CA (US); Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 121 days.

(21) Appl. No.: 15/963,016

(22) Filed: Apr. 25, 2018

(65) Prior Publication Data

US 2018/0310247 A1 Oct. 25, 2018

Related U.S. Application Data

(60) Provisional application No. 62/489,800, filed on Apr. 25, 2017.

(51) Int. Cl.
H04W 52/02 (2009.01)
H04W 24/08 (2009.01)
H04L 27/26 (2006.01)
H04W 48/16 (2009.01)
H04W 84/12 (2009.01)

(52) U.S. Cl.
CPC ....... H04W 52/0229 (2013.01); H04W 24/08 (2013.01); H04W 52/0235 (2013.01); H04L 27/2607 (2013.01); H04W 48/16 (2013.01); H04W 84/12 (2013.01)

(58) Field of Classification Search
CPC ......... H04W 52/0229; H04W 52/0235; H04W 24/08; H04W 84/12; H04W 48/16; H04L 27/2607
See application file for complete search history.

(56) References Cited

U.S. PATENT DOCUMENTS 9,801,157 B2 * 10/2017 Merlin ................. H04W 68/02
10,277,378 B2 * 4/2019 Huang ................. H04L 5/0092
(Continued)

FOREIGN PATENT DOCUMENTS

CN        107800526       3/2018
WO    WO-2018/032774     2/2018

OTHER PUBLICATIONS

Invitation to Pay Additional Fees and Partial International Search Report in International Application No. PCT/US2018/029375, dated Jul. 24, 2018 (11 pages).

(Continued)

Primary Examiner — Brian T O Connor

(57) ABSTRACT

A first communication device transmits a first packet that includes a wakeup request packet configured to prompt a wakeup radio at a second communication device to prompt a network interface device of the second communication device to transition from a low power state to an active state. The first communication device measures a delay period after an end of transmission of the first packet. The delay period corresponds to a time required for the network interface device of the second communication device to transition from the low power state to the active state. After at least the delay period, the first communication device transmits the second packet.

17 Claims, 11 Drawing Sheets

(56) References Cited

U.S. PATENT DOCUMENTS

| | | | |
|---|---|---|---|
| 10,321,402 B2* | 6/2019 | Park | H04L 27/183 |
| 2014/0112225 A1 | 4/2014 | Jafarian et al. | |
| 2015/0208349 A1 | 7/2015 | Ramamurthy et al. | |
| 2016/0366644 A1 | 12/2016 | Ghosh et al. | |
| 2016/0374020 A1 | 12/2016 | Azizi et al. | |
| 2017/0094600 A1 | 3/2017 | Min et al. | |
| 2017/0111858 A1 | 4/2017 | Azizi et al. | |
| 2018/0019902 A1 | 1/2018 | Suh et al. | |
| 2018/0020404 A1* | 1/2018 | Huang | H04W 52/0229 |
| 2018/0020405 A1* | 1/2018 | Huang | H04W 52/0229 |
| 2018/0184379 A1 | 6/2018 | Liu et al. | |
| 2018/0206192 A1 | 7/2018 | Vermani et al. | |
| 2019/0253965 A1* | 8/2019 | Gan | H04W 48/08 |
| 2019/0320388 A1* | 10/2019 | Li | H04W 52/0229 |
| 2020/0015167 A1* | 1/2020 | Huang | H04W 52/0235 |

OTHER PUBLICATIONS

International Search Report and Written Opinion in International Patent Application No. PCT/US2018/029375, dated Sep. 21, 2018 (15 pages).

U.S. Appl. No. 15/382,441, Chu et al., "Frame Exchange of STAs with Low Power Antenna," filed Dec. 16, 2016.

IEEE Std 802.11-REVmc™/D8.0 (revision of IEEE Std. 802.11™-2012) "Draft Standard for Information technology—Telecommunications and information exchange between systems—Local and metropolitan area networks-Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

Park et al., "Proposal for Wake-Up Receiver (WUR) Study Group," IEEE Draft 802.11-16/0722r1, 14 pages (May 18, 2016).

* cited by examiner

| Type 502 | BSS Color 504 | AID 506 | Reserved 508 | FCS 510 |
|---|---|---|---|---|
| 3 | 9 or 10 | 11 | 4 | 4 |

Bits:

| BSS Color 602 | AID 604 | FCS 606 |
|---|---|---|
| 9 or 10 | 11 | 4 |

Bits:

Determine a first time at which a first packet is to be transmitted by a first communication device such that an end of transmission of the first packet occurs at least a delay period prior to a second time at which transmission of a second packet is scheduled to begin, wherein the first packet includes a wakeup request packet configured to prompt a wakeup radio at a second communication device to prompt a network interface device of the second communication device to transition to an active state in which the network interface device is ready to receive the second packet 904

↓

Transmit the first packet at the determined first time 908

↓

Transmit the second packet at least the delay period after an end of transmission of the first packet 912

LOW POWER WAKEUP IN A WIRELESS NETWORK

CROSS REFERENCES TO RELATED APPLICATIONS

This application claims the benefit of U.S. Provisional Patent App. No, 62/489,800, entitled "Techniques for Implementing Low Power (LP) Wakeup in a Wireless Network," filed on Apr. 25, 2017, the disclosure of which is hereby expressly incorporated herein by reference in its entirety.

FIELD OF TECHNOLOGY

The present disclosure relates generally to wireless communication systems, and more particularly to wireless communication systems utilizing low power wakeup radios to implement power saving features.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Mbps) range. Future standards promise to provide even greater throughput, such as throughputs in the tens of Gbps range.

Some WLANs include low cost wireless devices, such as wireless sensors, that do not require high data rates. To reduce operating costs, it may be useful for such wireless devices to be battery operated or otherwise power constrained. Power saving techniques for reducing power consumption are used with such power-constrained wireless devices. For example, a WLAN network interface of a power-constrained wireless device is put into to a low power state (e.g., a sleep state) for periods of time in order to decrease power consumption of the wireless device. When the wireless device is ready to transmit data to an access point, the WLAN network interface is transitioned to an active state so that the data can be transmitted. After the WLAN network interface transmits the data, the WLAN network interface transitions back to the low power state.

A WLAN network interface of a power-constrained wireless device may "wake up" periodically to listen for transmissions from the access point to determine whether the access point has data to transmit to the wireless device. However, such periodic "wake ups" by the WLAN network interface consume power even when the access point has no data to transmit to the wireless device. Therefore, to further reduce power consumption, some wireless devices employ a low power wakeup radio (LP-WUR) that consumes much less power as compared to the WLAN network interface. For example, the LP-WUR does not include any transmitter circuitry and may be capable of only receiving very low data rate transmissions. When the access point is ready to transmit data to the wireless device, the access point transmits a wakeup request packet addressed to the wireless device. In response to receiving the wakeup request packet and determining that the wakeup request packet is addressed to the wireless device, the LP-WUR wakes up the WLAN network interface so that the WLAN network interface is ready to receive data from the access point.

SUMMARY

In an embodiment, a method includes: determining, at a first communication device, a first time at which a first packet is to be transmitted by the first communication device such that an end of transmission of the first packet occurs at least a delay period prior to a second time at which transmission of a second packet is scheduled to begin, wherein the first packet includes a wakeup request packet configured to prompt a wakeup radio at a second communication device to prompt a network interface device of the second communication device to transition to an active state in which the network interface device is ready to receive the second packet; transmitting, by the first communication device, the first packet at the determined first time; and transmitting, by the first communication device, the second packet at least the delay period after an end of transmission of the first packet.

In another embodiment, an apparatus comprising a first network interface device associated with a first communication device. The first network interface device comprises one or more integrated circuit (IC) devices configured to: determine a first time at which a first packet is to be transmitted by the first communication device such that an end of transmission of the first packet occurs at least a delay period prior to a second time at which transmission of a second packet is scheduled to begin, wherein the first packet includes a wakeup request packet configured to prompt a wakeup radio at a second communication device to prompt a second network interface device of the second communication device to transition to an active state in which the second network interface device is ready to receive the second packet, transmit the first packet at the determined first time, and transmit the second packet at least the delay period after an end of transmission of the first packet.

In yet another embodiment, a method includes: transmitting, by a first communication device, a first packet, wherein the first packet includes a wakeup request packet configured to prompt a wakeup radio at a second communication device to prompt a network interface device of the second communication device to transition from a low power state to an active state in which the network interface device is ready to receive a second packet from the first communication device; measuring, at the first communication device, a delay period after an end of transmission of the first packet, wherein the delay period corresponds to a time required for the network interface device of the second communication device to transition from the low power state to the active state to become ready to receive the second packet; and after at least the delay period, transmitting, by the first communication device, the second packet.

In still another embodiment, an apparatus comprises a first network interface device associated with a first communication device. The first network interface device comprises one or more IC devices configured to: transmit a first packet that includes a wakeup request packet configured to prompt a wakeup radio at a second communication device to prompt a second network interface device of the second communication device to transition from a low power state to an active state in which the second network interface device is ready to receive a second packet from the first communication device, measure a delay period after an end of transmission of the first packet, wherein the delay period corresponds to a time required for the second network interface device of the second communication device to transition from the low power state to the active state to become ready to receive the second packet, and after at least the delay period, transmit the second packet.

In a further embodiment, a method includes: transmitting, by a first communication device, a wakeup request packet configured to prompt a low-power wakeup radio (LP-WUR) of a second communication device to prompt a network interface device of the second communication device to transition from a low power state to an active state; receiving, by the first communication device, a first packet that includes information configured to prompt the first communication device to transmit data for the second communication device, the first packet having been transmitted by the network interface device of the second communication device in response to the LP-WUR of the second communication device receiving the wakeup request packet; and in response to receiving the first packet, transmitting, by the first communication device, a second packet that includes data for the second communication device.

In yet another embodiment, an apparatus comprises a first network interface device associated with a first communication device. The first network interface device comprises one or more IC devices configured to: transmit a wakeup request packet configured to prompt a low-power wakeup radio (LP-WUR) of a second communication device to prompt a second network interface device of the second communication device to transition from a low power state to an active state, receive a first packet that includes information configured to prompt the first network interface device to transmit data for the second communication device, the first packet having been transmitted by the second network interface device of the second communication device in response to the LP-WUR of the second communication device receiving the wakeup request packet, and in response to receiving the first packet, transmit a second packet that includes data for the second communication device.

In still another embodiment, a method includes receiving, at a LP-WUR of a first communication device, a wakeup request packet configured to prompt the LP-WUR to generate a wakeup signal to prompt a network interface device of the first communication device to transition from a low power state to an active state; in response to receiving the wakeup request packet, generate, at the LP-WUR, the wakeup signal; in response to the wakeup signal, transitioning the network interface device from the low power state to the active state; transmitting, by the network interface device, a first packet that includes information configured to prompt a second communication device to transmit data for the first communication device; and receiving, at the network interface device, a second packet that includes data for the first communication device, the second packet having been transmitted by the second communication device in response to the first packet.

In a further embodiment, an apparatus comprising: a LP-WUR associated with a first communication device. The LP-WUR is configured to receive a wakeup request packet, and the LP-WUR includes circuitry configured to generate a wakeup signal in response to the LP-WUR receiving the wakeup request packet. The apparatus also comprises a network interface device associated with the first communication device. The network interface device is coupled to the LP-WUR, and comprises one or more IC devices configured to: in response to the wakeup signal, transition the network interface device from a low power state to the active state, transmit a first packet that includes information configured to prompt a second communication device to transmit data for the first communication device, and receive a second packet that includes data for the first communication device, the second packet having been transmitted by the second communication device in response to the first packet.

BRIEF DESCRIPTION OF THE DRAWINGS

FIG. 6 is a block diagram of an example payload in a wakeup request packet, according to an embodiment.

FIG. 7 is a block diagram of another example payload in a wakeup request packet, according to an embodiment.

FIG. 10 is a flow diagram of an example method of transmitting a first packet to prompt a network interface device of another communication device to transition to an active state to receive a second packet, according to an embodiment.

DETAILED DESCRIPTION

In embodiments described below, an access point (AP) is configured to transmit a wakeup request packet to one or more client stations, causing the one or more client stations to transition from a low power state to an active state. In an embodiment, the wakeup request packet indicates a type of a subsequent packet to be transmitted, by the AP to the one or more client stations, following the transition of the one or more client station from the low power state to the active state. In an embodiment, a timing of the transmission of the wakeup request packet and/or a timing of the transmission of the subsequent packet accounts for a delay in a transition of a network interface of a client station from a low power state to an active state.

Low power wakeup techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, the same or similar power saving techniques are utilized in other types of wireless communication systems such as personal area networks (PANs), mobile communication networks such as cellular networks, metropolitan area networks (MANs), satellite communication networks, etc.

Figure 1A:
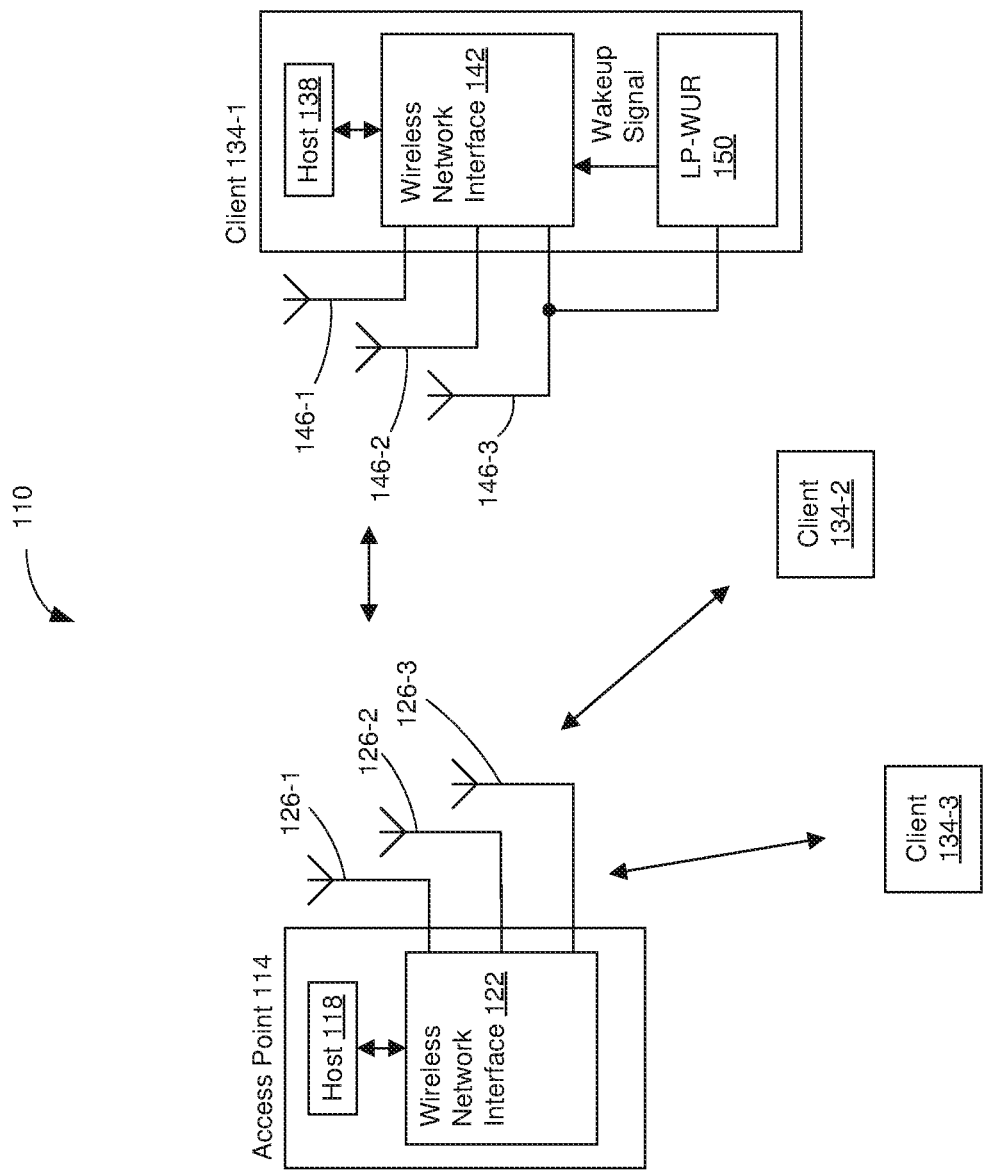
FIG. 1A is a block diagram of an example wireless local area network (WLAN) having a client station with a low power wakeup radio (LP-WUR), according to an embodiment.

FIG. 1A is a block diagram of an example WLAN 110, according to an embodiment. The WLAN 110 includes an access point (AP) 114 that comprises a host processor 118 coupled to a wireless network interface device 122. The wireless network interface device 122 is coupled to a plurality of antennas 126. Although three antennas 126 are illustrated in FIG. 1A, the AP 114 includes other suitable numbers (e.g., 1, 2, 4, 5, etc.) of antennas 126 in other embodiments. As will be described in more detail below, the wireless network interface device 122 is configured to generate and transmit a wakeup request packet that can be decoded by low power wakeup radios (LP-WURs) in the WLAN 110. Generally, a wakeup radio is a radio device that includes a wireless receiver configured to detect packets (sometimes referred to herein as "wakeup request packets") that indicate that the wakeup radio is to prompt another network interface device to transition from a low power state to an active state. The wakeup radio includes circuitry configured to prompt the other network interface device to transition from the low power state to the active state in response to the wakeup radio detecting a wakeup packet indicating that the wakeup radio should prompt the other network interface device to transition from the low power state to the active state.

The host processor 118 is configured to executed machine readable instructions stored in a memory device (not shown), according to an embodiment. The host processor 118 is implemented on an integrated circuit (IC), according to an embodiment. The wireless network interface device 122 is implemented on one or more ICs. The host processor 118 is implemented on one IC and the wireless network interface device 122 is implemented on one or more other, different ICs, according to an embodiment. The host processor 118 is implemented on a first IC and the wireless network interface device 122 is implemented on at least the same first IC and optionally on one or more second ICs, according to an embodiment.

The WLAN 110 also includes one or more client stations 134. Although three client stations 134 are illustrated in FIG. 1A, the WLAN 110 includes other suitable numbers (e.g., 1, 2, 4, 5, 6, etc.) of client stations 134 in various embodiments. The client station 134-1 includes a host processor 138 coupled to a wireless network interface device 142. The wireless network interface device 142 is coupled to one or more antennas 146. Although three antennas 146 are illustrated in FIG. 1A, the client station 134-1 includes other suitable numbers (e.g., 1, 2, 4, 5, etc.) of antennas 146 in other embodiments.

The AP 114 and the one or more client stations 134 in the WLAN 110 may be distributed into one or basic service sets (BSSs). For instance, the AP 114 and two client stations 134 (e.g., client stations 134-1 and 134-2) may comprise one BSS. Devices within the BSS are capable of communicating with one another using a shared set of networking parameters (e.g., operating channel frequency, operating channel frequency bandwidth, etc.). In some embodiments, the WLAN 110 may comprise of more than one BSS. For instance, a second BSS may include the AP 114 and a client stations 134-3. Thus, in some embodiments, the AP 114 may be capable of supporting multiple BSSs.

The wireless network interface device 142 is configured to go into a low power state in which the wireless network interface device 142 consumes significantly less power as compared to an active state of the wireless network interface device 142. The wireless network interface device 142 is capable of wirelessly receiving and transmitting via the one or more antennas 146 while in the active state. In an embodiment, the wireless network interface device 142 is incapable of wirelessly receiving and transmitting via the one or more antennas 146 while in the low power state.

The client station. 134-1 also includes a LP-WUR 150 coupled to the wireless network interface device 142 and to at least one of the antennas 146. The LP-WUR 150 is configured to use very low power (e.g., less than 100 microwatts or another suitable amount of power). The LP-WUR 150 is configured to use significantly less power (e.g., less than 20%, less than 10%, less than 5%, less than 2%, less than 1%, etc.) than the wireless network interface device 142 while the wireless network interface device 142 is in the active state, according to an embodiment.

The LP-WUR 150 is configured to receive and decode wakeup request packets transmitted by the AP 114 and received via one or more of the antennas 146. The LP-WUR 150 is configured to determine whether a received wakeup request packet includes an address (e.g., a media access control layer protocol (MAC) address, an association identifier (AID), or another suitable network address) corresponding to the client station 134-1, according to an embodiment. The LP-WUR 150 is configured to generate a wakeup signal in response to determining that a received wakeup request packet includes the address corresponding to the client station 134-1.

When the wireless network interface device 142 is in the low power state and receives the wakeup signal from the LP-WUR 150, the wireless network interface device 142 is configured to transition to the active power state in response to the wakeup signal, according to an embodiment. For example, when the wireless network interface device 142 is in the low power state and receives the wakeup signal from the LP-WUR 150, the wireless network interface device 142 responsively transitions to the active power state to become ready to transmit and/or receive, according to an embodiment.

The host processor 138 is configured to executed machine readable instructions stored in a memory device (not shown), according to an embodiment. The host processor 138 is implemented on an IC, according to an embodiment. The wireless network interface device 142 is implemented on one or more ICs. The host processor 138 is implemented on one IC and the wireless network interface device 142 is implemented on one or more other, different ICs, according to an embodiment. The host processor 138 is implemented on a first IC and the wireless network interface device 142 is implemented on at least the same first IC and optionally on one or more second ICs, according to an embodiment.

The LP-WUR 150 is implemented on one IC and the wireless network interface device 142 is implemented on one or more other, different ICs, according to an embodiment. The LP-WUR 150 is implemented on a first IC and the wireless network interface device 142 is implemented on at least the same first IC and optionally on one or more second ICs, according to an embodiment.

In an embodiment, each of the client stations 134-2 and 134-3 has a structure that is the same as or similar to the client station 134-1. For example, one or both of the client stations 134-2 and 134-3 includes a respective LP-WUR, according to an embodiment. As another example, one or both of the client stations 134-2 and 134-3 does not include a LP-WUR, according to another embodiment. Each of the client stations 134-2 and 134-3 has the same or a different number of antennas (e.g., 1, 2, 3, 4, 5, etc.). For example, the client station 134-2 and/or the client station 134-3 each have only two antennas (not shown), according to an embodiment.

Figure 1C:
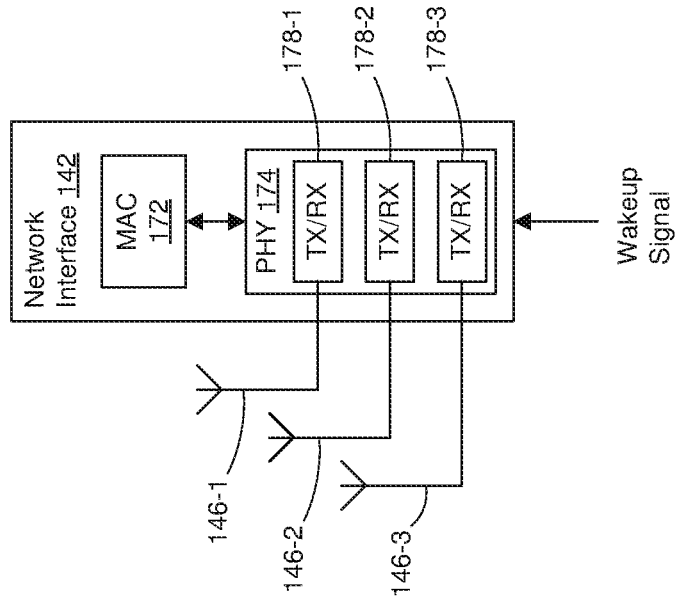
FIG. 1C is a block diagram of an example wireless network interface device of the client station included in the WLAN of FIG. 1A, according to an embodiment.
Figure 1B:
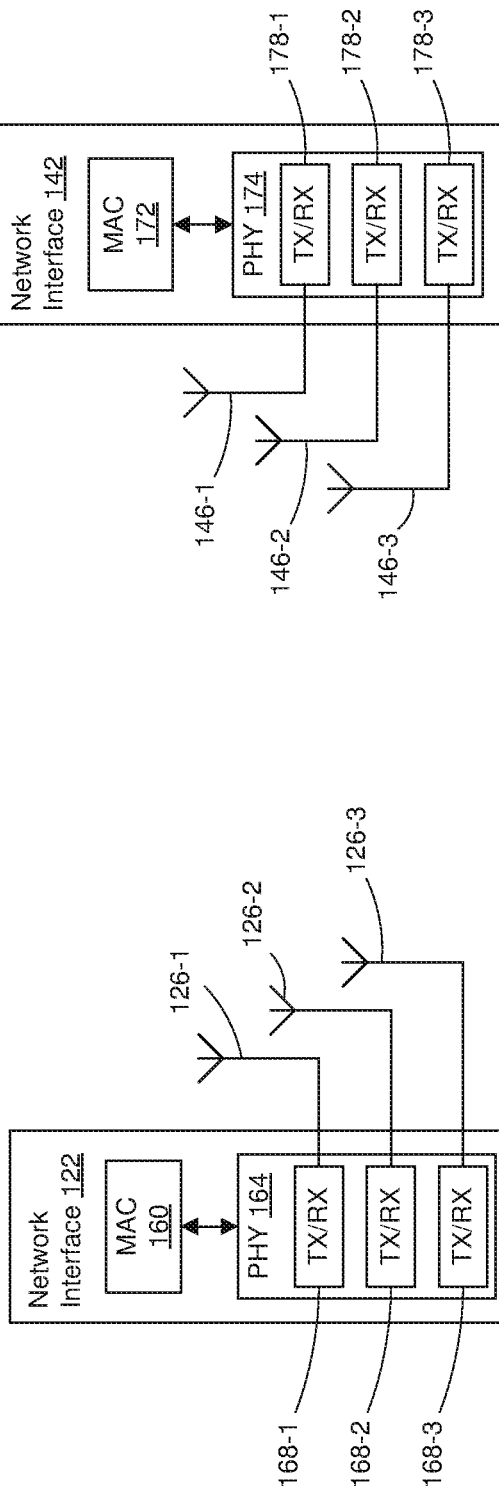
FIG. 1B is a block diagram of an example wireless network interface device of an access point included in the WLAN of FIG. 1A, according to an embodiment.

FIG. 1B is a block diagram of the network interface device 122 of the AP 114 of FIG. 1A, according to an embodiment. The network interface 122 includes a MAC layer processor 160 coupled to a physical layer protocol (PHY) processor 164. The PHY processor 164 includes a plurality of transceivers 168 coupled to the plurality of antennas 126. Although three transceivers 168 and three antennas 126 are illustrated in FIG. 1B, the PHY processor 164 includes other suitable numbers (e.g., 1, 2, 4, 5, etc.) of transceivers 168 coupled to other suitable numbers of antennas 126 in other embodiments. In some embodiments, the AP 114 includes a higher number of antennas 126 than transceivers 168, and the PHY processor 164 is configured to use antenna switching techniques.

The network interface 122 is implemented using one or more ICs configured to operate as discussed below. For example, the MAC processor 160 may be implemented, at least partially, on a first IC, and the PHY processor 164 may be implemented, at least partially, on a second IC. As another example, at least a portion of the MAC processor 160 and at least a portion of the PHY processor 164 may be implemented on a single IC. For instance, the network interface 122 may be implemented using a system on a chip (SoC), where the SoC includes at least a portion of the MAC processor 160 and at least a portion of the PHY processor 164.

In various embodiments, the MAC processor 160 and/or the PHY processor 164 of the AP 114 are configured to generate data units, and process received data units, that conform to a WLAN communication protocol such as a communication protocol conforming to the IEEE 802.11 Standard or another suitable wireless communication protocol. For example, the MAC processor 160 may be configured to implement MAC functions, including MAC functions of the WLAN communication protocol, and the PHY processor 164 may be configured to implement PHY functions, including PHY functions of the WLAN communication protocol. For instance, the MAC layer processor 160 may be configured to generate MAC layer data units such as MAC service data units (MSDUs), MAC protocol data units (MPDUs), etc., and provide the MAC layer data units to the PHY processor 164. The PHY processor 164 may be configured to receive MAC layer data units from the MAC layer processor 160 and encapsulate the MAC layer data units to generate PHY data units such as PHY protocol data units (PPDUs) for transmission via the antennas 126. Similarly, the PHY processor 164 may be configured to receive PHY data units that were received via the antennas 126, and extract MAC layer data units encapsulated within the PHY data units. The PHY processor 164 may provide the extracted MAC layer data units to the MAC layer processor 160, which then processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 164 is configured to generate one or more RF signals that are provided to the one or more antennas 126. The PHY processor 164 is also configured to receive one or more RF signals from the one or more antennas 126.

The MAC processor 160 is configured to control the PHY processor 164 to generate one or more RE signals by, for example, providing one or more MAC layer data units (e.g., MPDUs) to the PHY processor 164, and optionally providing one or more control signals to the PHY processor 164, according to some embodiments. In an embodiment, the MAC processor 160 includes a processor configured to execute machine readable instructions stored in a memory device (not shown) such as a RAM, a read ROM, a flash memory, etc. In an embodiment, the MAC processor 160 includes a hardware state machine.

In some embodiments, the MAC processor 160 includes a timer (e.g., a counter configured to increment/decrement at a constant rate) to measure a delay period between transmission of a wakeup request packet and subsequent packet.

FIG. 1C is a block diagram of the network interface device 142 of the client station 134-1 of FIG. 1A, according to an embodiment. The network interface 142 includes a MAC layer processor 172 coupled to a PHY processor 174. The PHY processor 174 includes a plurality of transceivers 178 coupled to the one or more antennas 146. Although three transceivers 178 and three antennas 126 are illustrated in FIG. 1C, the PHY processor 174 includes other suitable numbers (e.g., 1, 2, 4, 5, etc.) of transceivers 178 coupled to other suitable numbers of antennas 146 in other embodiments. In some embodiments, the client station 134-1 includes a higher number of antennas 146 than transceivers 178, and the PHY processor 174 is configured to use antenna switching techniques.

The network interface 142 is implemented using one or more ICs configured to operate as discussed below. For example, the MAC layer processor 172 may be implemented, at least partially, on a first IC, and the PHY processor 174 may be implemented, at least partially, on a second IC. As another example, at least a portion of the MAC layer processor 172 and at least a portion of the PHY processor 174 may be implemented on a single IC. For instance, the network interface 142 may be implemented using a system on a chip (SoC), where the SoC includes at least a portion of the MAC layer processor 172 and at least a portion of the PHY processor 174.

In various embodiments, the MAC layer processor 172 and the PHY processor 174 of the client device 1544 are configured to generate data units, and process received data units, that conform to the WLAN communication protocol or another suitable communication protocol. For example, the MAC layer processor 172 may be configured to implement MAC layer functions, including MAC layer functions of the WLAN communication protocol, and the PHY processor 174 may be configured to implement PHY functions, including PHY functions of the WLAN communication protocol. The MAC layer processor 172 may be configured to generate MAC layer data units such as MSDUs, MPDUs, etc., and provide the MAC layer data units to the PHY processor 174. The PHY processor 174 may be configured to receive MAC layer data units from the MAC layer processor 172 and encapsulate the MAC layer data units to generate PRY data units such as PPDUs for transmission via the one or more antennas 146. Similarly, the PHY processor 174 may be configured to receive PHY data units that were received via the one or more antennas 146, and extract MAC layer data units encapsulated within the PHY data units. The PHY processor 174 may provide the extracted MAC layer data units to the MAC layer processor 172, which then processes the MAC layer data units.

As discussed above, the network interface device 142 is configured to transition between an active state and a low power state. When the wireless network interface device 142 is in the low power state and receives the wakeup signal from the LP-WUR 150, the wireless network interface device 142 is configured to transition to the active power state in response to the wakeup signal, according to an embodiment. In various embodiments, there is a time delay between the reception of a wakeup request packet at the LP-WUR 150 and the transition of the network interface device 142 to an active power state from a low power state. In an embodiment, the time delay results from physical limitations in the LP-WUR 150 and wireless network interface device 142. In an embodiment, the time delay is fixed by the IEEE 802.11 standard.

The PHY processor 174 is configured to downconvert one or more RF signals received via the one or more antennas 146 to one or more baseband analog signals, and convert the analog baseband signal(s) to one or more digital baseband signals, according to an embodiment. The PHY processor 174 is further configured to process the one or more digital baseband signals to demodulate the one or more digital baseband signals and to generate a PPDU. The PHY processor 174 includes amplifiers (e.g., an LNA, a power amplifier, etc.), an RF downconverter, an RF upconverter, a plurality of filters, one or ADCs, one or more DACs, one or more DFT calculators (e.g., a fast Fourier transform (FFT) calculator), one or more IDFT calculators (e.g., an inverse fast Fourier transform (IFFT) calculator), one or more modulators, one or more demodulators, etc.

The PHY processor 174 is configured to generate one or more RF signals that are provided to the one or more antennas 146. The PHY processor 174 is also configured to receive one or more RF signals from the one or more antennas 146.

The MAC processor 172 is configured to control the PHY processor 174 to generate one or more RF signals by, for example, providing one or more MAC layer data units (e.g., MPDUs) to the PHY processor 174, and optionally providing one or more control signals to the PHY processor 174, according to some embodiments. In an embodiment, the MAC processor 172 includes a processor configured to execute machine readable instructions stored in a memory device (not shown) such as a RAM, a read ROM, a flash memory, etc. In an embodiment, the MAC processor 172 includes a hardware state machine.

Figure 1D:
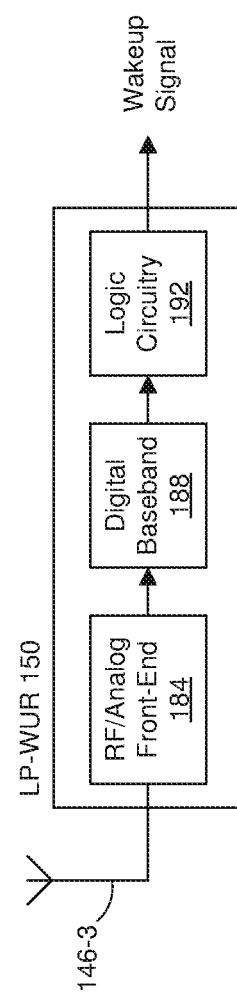
FIG. 1D is a block diagram of an example LP-WUR in the WLAN of FIG. 1A, according to an embodiment.

FIG. 1D is a block diagram of the LP-WUR 150 of the client station 134-1 of FIG. 1A, according to an embodiment. The LP-WUR 150 includes radio frequency (RF)/ analog front-end circuitry 184 coupled to at least one of the antennas 146. The RF/analog front-end circuitry 184 includes one or more amplifiers (e.g., a low noise amplifier (LNA)), an RF downconverter, one or more filters, and one or more analog-to-digital converters (ADCs). In an embodiment, the RF/analog front-end circuitry 184 is configured to downconvert an RF signal to a baseband analog signal, and convert the analog baseband signal to a digital baseband signal.

The RE/analog front-end circuitry 184 is coupled to digital baseband circuitry 188. The digital baseband circuitry 188 is configured to process the digital baseband signal to determine whether the digital baseband signal corresponds to a wakeup request packet. The digital baseband circuitry 188 includes a demodulator that demodulates data from the digital baseband signal to generate an information signal corresponding to information included in a wakeup request packet.

The digital baseband circuitry 188 is coupled to logic circuitry 192. The logic circuitry 192 is configured to process the information signal to determine whether a wakeup request packet includes an address (e.g., a MAC address, an AID, or another suitable network address) corresponding to the client station 134-1, according to an embodiment. The logic circuitry 192 is configured to generate the wakeup signal in response to determining that a received wakeup request packet includes the address corresponding to the client station 134-1. In some embodiments, the address is a unicast address. In some embodiments, there are multiple addresses corresponding to the client station 134-1, and the logic circuitry 192 is configured to generate the wakeup signal in response to determining that a received wakeup request packet includes any of the multiple addresses corresponding to the client station 134-1. For example, the multiple addresses include one or more multicast addresses corresponding to one or more groups of communication devices to which the client station 134-1 belongs, according to an embodiment. As another example, the addresses include one or more broadcast addresses.

In some embodiments, the logic circuitry 192 is configured analyze multiple address fields in the wakeup request packet, and to generate the wakeup signal in response to analyzing the multiple address fields. For example, in some embodiments the wakeup request packet includes a first network address field that indicates a wireless communication network to which the wakeup request packet corresponds, and a second network address field that indicates one or more intended recipients of the wakeup request packet; the logic circuitry 192 is configured analyze the multiple address fields in the wakeup request packet, and to generate the wakeup signal in response to determining that i) the first network address field indicates a wireless communication network to which the client station 134-1 belongs, and ii) the second network address field includes any of one or more addresses corresponding to the client station 134-1. In an embodiment in which the client station 134-1 is seeking to join a wireless communication network, the logic circuitry 192 is configured analyze the multiple address fields in the wakeup request packet, and to generate the wakeup signal in response to determining that i) the first network address field indicates the wireless communication network to which the client station 134-1 is seeking to join, and ii) the second network address field includes any of one or more addresses corresponding to the client station 134-1.

As another example, in some embodiments the wakeup request packet includes a first network address field that indicates a transmitter of the wakeup request packet, and a second network address field that indicates one or more intended recipients of the wakeup request packet; the logic circuitry 192 is configured analyze the multiple address fields in the wakeup request packet, and to generate the wakeup signal in response to determining that i) the first network address field indicates a transmitter that the client station 134-1 recognizes as transmitting wakeup request packets, and ii) the second network address field includes any of one or more addresses corresponding to the client station 134-1. In an embodiment in which the client station 134-1 is seeking to join a wireless communication network, the logic circuitry 192 is configured analyze the multiple address fields in the wakeup request packet, and to generate the wakeup signal in response to determining that i) the first network address field indicates the AP of the wireless communication network to which the client station 134-1 is seeking to join, and ii) the second network address field includes any of one or more addresses corresponding to the client station 134-1.

In some embodiments, the logic circuitry 192 is configured to analyze information in the wakeup request packet that indicates a type of packet that will follow the wakeup request packet and/or a type of procedure to which the packet that will follow the wakeup request packet corresponds. In an embodiment, the logic circuitry 192 is configured to determine whether to generate the wakeup signal based on the analysis of the information in the wakeup request packet that indicates the type of packet that will follow the wakeup request packet and/or the type of procedure to which the packet that will follow the wakeup request packet corresponds.

In some embodiments, the logic circuitry 192 is configured to provide to the network interface 142, in addition to the wakeup signal, information regarding the type of packet that will follow the wakeup request packet and/or the type of procedure to which the packet that will follow the wakeup request packet corresponds.

In some embodiments, the logic circuitry 192 is configured to provide to the network interface 142, in addition to the wakeup signal, information obtained from the wakeup request packet.

In some embodiments, the network interface device 142 is configured to provide configuration information to the LP-WUR 150 regarding conditions in which the LP-WUR 150 should generate the wakeup signal. For example, in an embodiment, the network interface device 142 is configured to provide the LP-WUR 150 with one or more addresses to which the client station 134-1 corresponds. As another example, in an embodiment, the network interface device 142 is configured to provide the LP-WUR 150 with an address of a wireless communication network to which the client station 134-1 belongs or is seeking to join. As another example, in an embodiment, the network interface device 142 is configured to provide the LP-WUR 150 with an address of another communication device (e.g., an AP) that will be transmitting wakeup request packets to the client station 134-1. The LP-WUR 150 includes a memory (not shown) to store configuration information received from the network interface device 142, in an embodiment. The logic circuitry 192 is configured to use the configuration information stored in the memory of the LP-WUR 150 to determine when to generate the wakeup signal, in an embodiment.

In some embodiments, the LP-WUR 150 does not includes a transmitter. In other embodiments, the LP-WUR 150 includes a transmitter to transmit acknowledgements of wakeup request packets, for example.

Figure 2:
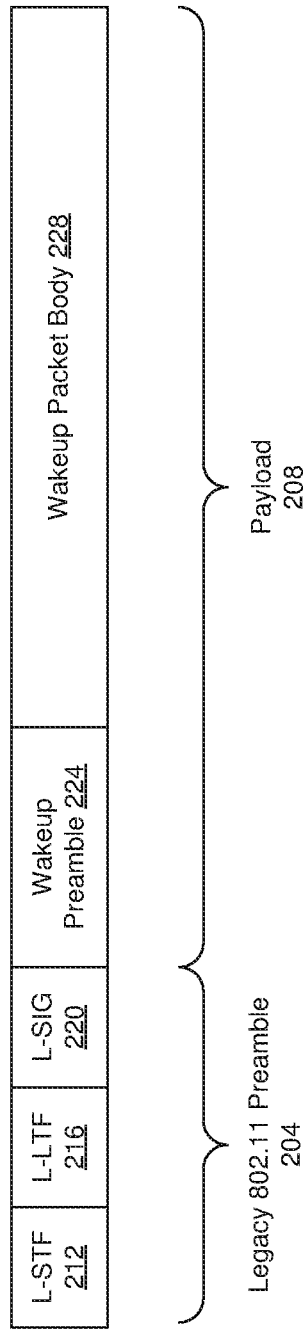
FIG. 2 is a block diagram of an example wakeup request packet, according to an embodiment.

FIG. 2 is a block diagram of an example wakeup request packet 200 used in the example WLAN 110 of FIG. 1, according to an embodiment. The network interface 122 of the AP 114 is configured to generate and transmit the wakeup request packet 200, according to an embodiment. The network interface 142 of the client station 134-1 is also configured to generate and transmit the wakeup request packet 200, e.g., to prompt another client station 134 to wake up from a low power state, according to another embodiment.

The LP-WUR 150 of the client station 134-1 is configured to receive, detect, and decode the wakeup request packet 200, according to an embodiment.

The wakeup request packet 200 includes a legacy 802.11 preamble 204 and a payload 208. The legacy 802.11 preamble 204 corresponds to a legacy preamble defined by the IEEE 802.11 Standard, according to an embodiment. The legacy 802.11 preamble 204 enables IEEE 802.11 stations (e.g., wireless communication devices that are configured to operate according to the IEEE 802.11 Standard) to detect the wakeup request packet 200 and determine a length of the wakeup request packet 200 for the purpose of reducing transmissions by IEEE 802.11 stations that will collide with the wakeup request packet 200, according to an embodiment.

The legacy 802.11 preamble 204 includes a legacy short training field (L-STF) 212, a legacy long training field (L-LTF) 216, and a legacy signal field (L-SIG) 220. The L-STF 212 includes signals designed for packet detection and automatic gain control (AGC) training. The L-LTF 216 includes signals designed for channel estimation and synchronization. The L-SIG 220 includes information regarding the wakeup request packet 200, including length information (e.g., in a length subfield (not shown)) that can be used by IEEE 802.11 stations to determine when the wakeup request packet 200 will end.

In other embodiments, the wakeup request packet includes a legacy preamble (different than the legacy 802.11 preamble 204) that enables stations that conform to a different suitable wireless communication protocol (e.g., other than the IEEE 802.11 Standard) to detect the wakeup request packet 200 and determine a length of the wakeup request packet 200 for the purpose of reducing transmissions by such stations that will collide with the wakeup request packet 200, according to an embodiment.

The payload 208 includes a wakeup preamble 224. In an embodiment, the wakeup preamble 224 includes signals that enable LP-WURs such as the LP-WUR 150 to detect the wakeup request packet 220 and to synchronize to the wakeup request packet 220. The payload 208 also includes a wakeup request packet body 228. In an embodiment, the wakeup request packet body 228 includes an address (e.g., a MAC address, an AID, or another suitable network address) corresponding to a client station to which the wakeup request packet 200 is intended. Referring now to FIG. 1D, the digital baseband circuitry 188 is configured to detect the wakeup request packet 200 at least by detecting the wakeup preamble 224, according to an embodiment. The logic circuitry 192 is configured to process the wakeup request packet body 228 to determine whether the wakeup request packet body 228 includes an address (e.g., a. MAC address, an AID, or another suitable network address) corresponding to the client station 134-1.

In an embodiment, the AP 114 is configured to periodically transmit beacon frames at corresponding target beacon transmission times (TBTTs). Beacon frames indicate information regarding the WLAN, for instance information associated with a BSS in the WLAN. Such information is useable by client stations 134 to, for example, determine the presence, capabilities, and configuration of the WLAN and associate with the WLAN. A LP-WUR such as the LP-WUR 150 may be utilized to enable the network interface device 142 associated with the client station 134 to transition to an active state ahead of a TBTT such the client station 134 may appropriately synchronize to the information advertised by the beacon.

Figure 3:
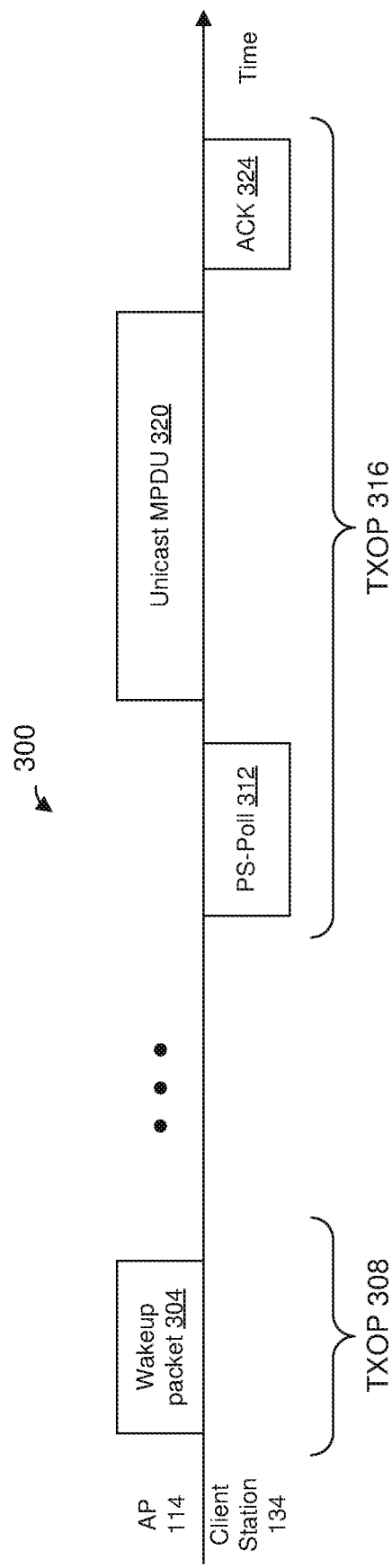
FIG. 3 is a block diagram of an example wakeup procedure for a single-user (SU) transmission in a WLAN, according to an embodiment.

FIG. 3 is a timing diagram of an example wakeup procedure 300 associated with a single-user (SU) power save poll (PS-Poll) exchange between two communication devices, according to an embodiment. FIG. 3 is discussed in the context of transmissions between the AP 114 and the client station 134 of FIG. 1 for explanatory purposes. In other embodiments, however, a similar transmission exchange occurs between other suitable communication devices, such as between two client stations.

A wakeup request packet 304, transmitted during a transmit opportunity (TXOP) 308, is configured to prompt a client station 134 to transition from a low power state to an active state prior to an SU frame exchange. In an embodiment, the wakeup request packet 304 is the wakeup request packet 200 of FIG. 2. In other embodiments, the wakeup request packet 304 is another suitable wakeup request packet. In an embodiment, the network interface 122 of the AP 114 is configured to generate and transmit the wakeup request packet 304 to prompt the client station 134 to transition from a low power state to an active state in preparation for a power-save poll (PS-poll) exchange with the AP 114.

The LP-WUR 150 of the client station 134 detects the wakeup request packet 304 and determines that the wakeup request packet 304 includes a network ID corresponding to the client station 134. In response to determining that the wakeup request packet 304 includes the network ID corresponding to the client station 134, the LP-WUR 150 generates the wakeup signal. In response to the wakeup signal, the network interface 142 transitions to the active state. Once in the active state, the network interface 142 generates a PS-Poll frame and transmits the PS-Poll frame in a PPDU 312 in connection with a TXOP 316. The network interface 142 remains in the active state in preparation for receiving data from the AP 114 in response to the PS-Poll frame.

In other embodiments, network interface 142 generates the PPDU 312 to include another suitable frame that is configured to prompt the AP 114 to transmit buffered data to the client station 134, such as a quality of service (QoS) null frame, a request-to-send (RTS) frame, etc.

In connection with receiving the PS-Poll frame in the PPDU 312, the network interface 122 of the AP 114 retrieves from a buffer data for the client station 134, generates a unicast MPDU having the data retrieved from the buffer, and transmits to the client station 134 the unicast MPDU in an SU PPDU 320. In an embodiment, the network interface 122 begins transmitting the SU PPDU 320 a suitable time period after an end of the PPDU 312, e.g., a short interframe space (SIFS) as defined by the IEEE 802.11 Standard, or another suitable time period.

In response to receiving the SU PPDU 320, the network interface 142 of the client station 134 generates an acknowledgement (ACK) frame and transmits the ACK frame in a PPDU 324 to the AP 114.

Figure 4:
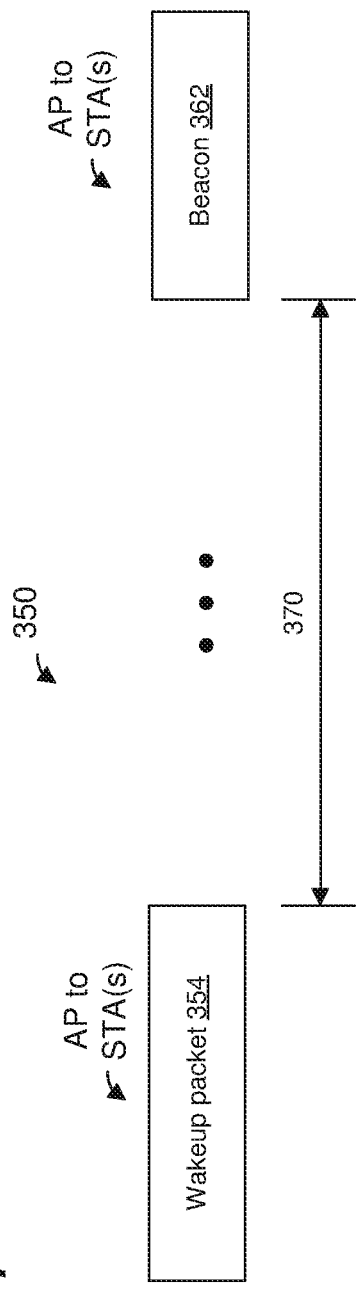
FIG. 4 is a block diagram of another example wakeup procedure in a WLAN, according to an embodiment.

FIG. 4 is a diagram of another example wakeup procedure 350, according to an embodiment. FIG. 3 is discussed in the context of the example network 110 of FIG. 1 for explanatory purposes. In other embodiments, however, a similar transmission exchange occurs in another suitable wireless network between other suitable communication devices.

A wakeup request packet 354 is configured to prompt one or more client stations 134 to transition from a low power state to an active state prior to a beacon frame transmission. In an embodiment, the wakeup request packet 354 is the wakeup request packet 200 of FIG. 2. In other embodiments, the wakeup request packet 354 is another suitable wakeup request packet. In an embodiment, the network interface 122 of the AP 114 is configured to generate and transmit the wakeup request packet 304 to prompt one or more client stations 134 to transition from a low power state to an active state prior to transmission of a beacon frame 362 by the AP 114. The beacon frame 362 includes information about capabilities and configuration of a wireless communication network being managed by the AP 114. In an embodiment, the AP 114 transmits beacon frames, such as the beacon frame 362, at a fixed time interval, in an embodiment. Thus, in an embodiment, the network interface device 122 of the AP 114 knows a time (e.g., a target beacon transmission time (Taff) at which the beacon 362 will be transmitted.

In an embodiment, the network interface 122 of the AP 114 is configured to generate and transmit the wakeup request packet 354 in a manner such that the network interface device(s) 142 at the one or more client stations 134 are afforded sufficient time to transition from a low power state to an active state prior to transmission of the beacon frame 362 from the AP 114. For instance, the AP 114 determines when transmission of the beacon frame 362 is scheduled to occur and transmits the wakeup request packet 354 such that an end of transmission of the wakeup request packet occurs at least a delay period 370 prior to when the beacon frame 362 is scheduled to be transmitted.

In an embodiment, the delay period 370 is determined based on a defer time previously indicated by the one or more client stations 134 to the AP 114. The defer time may be indicated by the one or more client stations 134 in corresponding MAC frames, such as association request frames, reassociation request frames, etc., and transmitted by the network interface device(s) 142 of the client station(s) 134 (e.g., within PPDUs). In an embodiment, the indicated defer time corresponds to a time delay between reception of a wakeup request packet at the LP-WUR. 150 and the transition of the network interface device 142 to an active power state at a client station 134. In an embodiment, the AP 114 receives a plurality of defer times from a plurality of client stations 134, and the AP 114 sets (e.g., the network interface device sets, the MAC processors sets 160, etc.) the delay period 370 to equal to a maximum defer time from amongst the plurality of defer times indicated by the plurality of client stations 134. In another embodiment, the delay period 370 is predetermined and/or specified by a communication protocol. Following the transmission of the wakeup request packet 304, the network interface 122 transmits the beacon frame 312 at a scheduled time. Because the AP 114 transmitted the wakeup request packet 354 the delay period 370 prior to the transmission of the beacon frame 362, the network interface(s) 142 of the one or more client station 134 have sufficient time to transition to the active state and be ready to receive the beacon frame 362.

In some embodiments, the AP 114 transmits a wakeup request packet such as the wakeup request packet 354 prior to every beacon frame transmission, at least when the AP 114 is aware that one or more client stations 134 are in the low power state. In other embodiments, however, the AP 114 transmits a wakeup request packet such as the wakeup request packet 354 prior to certain beacon frames, such as beacon frames that indicate updated information regarding the WLAN, at least when the AP 114 is aware that one or more client stations 134 are in the low power state. For instance, in an embodiment, the AP 114 transmits the wakeup request packet 354 only prior to beacon frames that carry updated BSS parameters (e.g., a new operating channel frequency, a new operating channel frequency bandwidth, etc.), at least when the AP 114 is aware that one or more client stations 134 are in the low power state. This results in further power saving by allowing client stations 134 to remain in the low power state and during transmissions of beacon frames that do not carry updated to BSS parameters.

In some embodiments, a WLAN corresponds to a unique identifier referred to as a BSS identifier (BSSID). In some embodiments, packets transmitted between devices in a WEAN include, in MAC headers of the packets, the BSSID. Thus, a communication device can identify a WLAN to which a packet corresponds by processing a MAC header of the packet to analyze the BSSID in the MAC header. The BSSID is a 48-bit MAC address (e.g., the MAC address of the AP 114), in some embodiments.

In some embodiments, a WLAN is also associated with a short ID sometimes referred to as a "color" or a "BSS color." In some embodiments, the AP 114 chooses (e.g., the MAC processor 160 chooses) a BSS color for the WLAN 110. In some embodiments, a length of a BSS color is six bits, which is significantly shorter than the length of the BSSID. In other embodiments, the BSS color has another suitable length such as eight bits, nine bits, ten bits, etc.

In some embodiments, packets transmitted between devices in a WLAN include, in PHY headers of the packets, the BSS color. Thus, a communication device can identify a WLAN to which a packet corresponds by processing the PHY header of the packet to analyze the BSS color in the PHY header. Because the BSS color is in the PHY header of a packet, a communication device in a WLAN can analyze the BSS color and determine whether the packet corresponds to the same WLAN (an "intra-BSS packet") or corresponds to another WLAN (an "inter-BSS packet") significantly more quickly than processing a MAC header of the packet and analyzing a. BSSID in the MAC header to determine whether the packet is an intra-BSS packet or an inter-BSS packet. A communication device in the WLAN 110 may determine, based on whether a packet is an intra-BSS packet or an inter-BSS packet (determined based on analyzing the BSS color of the packet), whether the communication device can go into a low power state during transmission of the packet, whether the communication device transmit another packet during transmission of a packet, etc., for example.

Because of the short length of the BSS color (e.g., as compared to the length of the BSSID), however, it is likely that a neighboring WLAN that is located proximate to the WLAN 110 will use a BSS color that is the same BSS color as chosen by the AP 114 for the WLAN 110. Thus, the AP 114 is configured to change (e.g., the MAC processor 160 is configured to change) a BSS color for the WLAN 110 in some instances, such as when the AP 114 determines (e.g., the MAC processor 160 determines) that a neighboring WLAN is using the same BSS color as the WLAN 110. In some embodiments, the AP 114 is configured to inform client stations 134 in the WLAN 110 that the AP 114 is changing the BSS color for the WLAN 110.

In certain situation, for example, following a glitch that results in the AP 114 restarting, the AP 114 begins using a default BSS color that may be different than the BSS color that the AP 114 was previously using. In such situations, the client stations 134 in the WLAN 110 assume that the previous BSS color is still being used and will thus assume that packets being transmitted by the AP 114 (e.g., beacon frames) with the default BSS color identifier are inter-BSS packets and may inadvertently ignore the packets being transmitted by the AP 114. As a result, client stations 134 may temporarily lose communication contact with the AP 114. For client stations 134 that are in the low power state, the loss of communication contact with the AP 114 may be prolonged.

In some embodiments, the network interface device 122 (e.g., the MAC processor 160) of the AP 114 is configured to store in a memory device of the network interface device 122 a BSS color most recently used by the AP 114 (last-used color). In other embodiments, the network interface device 122 (e.g., the MAC processor 160) of the AP 114 is not configured to store the last-used color.

In an embodiment, the network interface device 122 (e.g., the MAC processor 160) is configured to determine when the network interface device 122 has started up (e.g., from a power up event, in response to a hardware-initiated reset, in response to a software-initiated reset, as a result of a recovery procedure, etc.). The network interface device 122 (e.g., the MAC processor 160) is configured to transmit a wakeup request packet in response to determining that the network interface device 122 has started up, wherein the wakeup request packet includes information that indicates that the AP 114 has recently started up and/or recently performed a recovery procedure (e.g., from a power up event, in response to a hardware-initiated reset, in response to a software-initiated reset, as a result of a recovery procedure, etc.). Client stations 134 that receive a wakeup request packet with information indicating that the AP 114 has recently started up responsively determine, or become ready to determine, whether the AP 114 has changed or will change the BSS color from the last-used color. In an embodiment, the AP 114 (e.g., the network interface device 122, the MAC processor 160, etc.) is configured to transmit the wakeup request packet with information indicating that the AP 114 has recently started up a delay period prior to transmitting a beacon. In an embodiment, the beacon includes information indicating which BSS color the AP 114 is, or will be, using (the "new" color). In some embodiments, the wakeup request packet includes the new color. In an embodiment, the wakeup request packet includes one or both of the last-used color and the new color. In an embodiment, the wakeup request packet does not include the last-used color nor the new color. In an embodiment, the wakeup request packet 304 indicates that a beacon with the new BSS color is to be transmitted following the wakeup request packet.

In some embodiments, the logic circuitry 192 is configured to generate the wakeup signal in response to determining that the wakeup request packet includes information that indicates that the AP 114 has recently started up and/or recently performed a recovery procedure. In some embodiments, the logic circuitry 192 is configured to generate the wakeup signal in response to determining i) that the wakeup request packet includes information that indicates that the AP 114 has recently started up and/or recently perforated a recovery procedure, and ii) that the last-used color information in the wakeup request packet corresponds to a wireless communication network to which the client station 134-1 belongs. In various embodiments, the logic circuitry 192 is configured to provide to the network interface 142, in addition to the wakeup signal, one or more of i) an indication that the wakeup request packet corresponds to the AP 114 having recently started up and/or recently performed a recovery procedure, ii) the last-used color, and/or iii) the new color.

Figure 5:
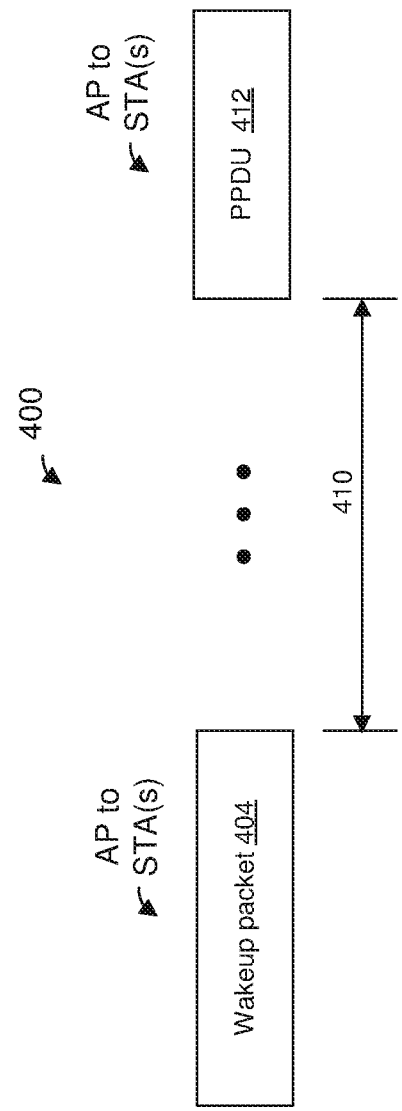
FIG. 5 is a block diagram of another example wakeup procedure in a WLAN, according to an embodiment.

In an embodiment, an AP 114 transmits a wakeup request packet prior to packets that are not necessarily beacon packets. FIG. 5 is a diagram of another example wakeup procedure 400, according to an embodiment. FIG. 5 is discussed in the context of the example network 110 of FIG. 1 for explanatory purposes. In other embodiments, however, a similar transmission exchange occurs in another suitable wireless network between other suitable communication devices.

A wakeup request packet 404 is configured to prompt one or more client stations 134 to transition from a low power state to an active state ahead of a transmission of a PPDU 412. In an embodiment, the wakeup request packet 404 is the same as or similar to the wakeup request packet 200. In an embodiment, the network interface 122 of the AP 114 is configured to generate and transmit the wakeup request packet 404 to prompt one or more client stations 134 to transition from a low power state to an active state ahead of transmission of the PPDU 412 from the AP 114.

The PPDU 412 from the AP 114 may be a unicast PPDU, a multicast PPDU, a broadcast PPDU, etc., according to various embodiments. In an embodiment, the network interface 122 of the AP 114 is configured to generate and transmit the wakeup request packet 404 in a manner such that the network interface device(s) 142 at the one or more client stations 134 are afforded sufficient time to transition from a low power state to an active state prior to transmission of the PPDU 412 by the AP 114. For instance, the AP 114 transmits the wakeup request packet 404 and measures a delay period 410 corresponding to at least a time required for the network interface device(s) 142 at the one or more client stations 134 to transition from a low power state to an active state, and then transmits the PPDU 412 following the delay period 410.

In an embodiment, the PPDU 412 is a unicast PPDU to a client station 134 and the delay period 410 is determined based on a defer time previously indicated (e.g., in an association request frame, a reassociation request frame, etc.) by the client station 134. For instance, the delay period 410 is set to be at least equal to the defer time previously indicated by the client station 134. When the PPDU 412 is a unicast PPDU, the client station 134 generates and transmits an ACK frame (not shown) responsive to the unicast PPDU 412, according to an embodiment.

In an embodiment, the PPDU 412 is a multicast PPDU or a broadcast PPDU to two or more client stations 134, and the delay period 410 is determined based on respective defer times indicated by the two or more client stations 134. For instance, the delay period 410 is set to be at least equal to a maximum defer time amongst a plurality of defer times indicated by the two or more client stations 134. In an embodiment, an indicated defer time corresponds to a time delay between the reception of a wakeup request packet at the LP-WUR 150 and the transition of the network interface device 142 to an active power state at a client station 134. In another embodiment, the delay period 410 is predetermined and/or specified by a communication protocol. Following the transmission of the wakeup request packet 404 and after the delay period 410, the network interface 122 transmits the PPDU 412.

Following the reception of the PPDU 412 at the one or more client stations 134, the one or more client stations 134 may transmit respective acknowledgment(s) (ACK(s)) 416 to the AP 114 to acknowledge reception of the PPDU 412. In some embodiments, the one or more client stations 134 do not transmit ACK(s) to the AP 114.

In an embodiment, the wakeup procedure 400 is utilized during an association procedure when an unassociated client station seeks to join a BSS managed by the AP. The unassociated client station 134 transmits an authentication request frame (in a PPDU) to an AP 114. The AP 114 transmits an ACK (in a PPDU) of the association request frame to the client station 134. Following the reception of the ACK at the client station. 134, the client station 134 transitions to a low power state to preserve power. After transmitting the ACK and prior to transmitting an authentication response frame, the AP 114 transmits the wakeup request packet 404 to the client station 134. In an embodiment, the wakeup request packet 404 includes information that indicates that the wakeup request packet 404 corresponds to an association procedure.

The LP-WUR. 150 of the client station 134 is configured to analyze the wakeup request packet 404 and determine that the wakeup request packet 404 corresponds to an association procedure. In response to determining that the wakeup request packet 404 corresponds to the association procedure, the LP-WUR 150 generates the wakeup signal to initiate the transition of the network interface device 142 to the active state.

After transmitting the wakeup request packet 404 and after the delay period, the AP 114 transmits an authentication response frame (e.g., included in the PPDU 412) to the client station 134. The network interface device 142 is in the active state when the authentication response frame is received, and thus the network interface device 142 processes the authentication response frame.

Based on processing of the authentication response frame, the client station 134 may continue the association procedure with the AP 114. For example, the above procedure may be repeated with an association request/association response exchange, as described below.

The unassociated client station 134 then transmits an association request frame (in a PPDU) to the AP 114. The AP 114 transmits an ACK (in a PPDU) of the association request frame to the client station 134. Following the reception of the ACK at the client station 134, the client station 134 transitions to a low power state to preserve power. After transmitting the ACK and prior to transmitting an association response frame, the AP 114 transmits the wakeup request packet 404 to the client station 134. In an embodiment, the wakeup request packet 404 includes information that indicates that the wakeup request packet 404 corresponds to an association procedure.

The LP-WUR 150 of the client station 134 is configured to analyze the wakeup request packet 404 and determine that the wakeup request packet 404 corresponds to an association procedure. In response to determining that the wakeup request packet 404 corresponds to the association procedure, the LP-WUR 150 generates the wakeup signal to initiate the transition of the network interface device 142 to the active state.

After transmitting the wakeup request packet 404 and after the delay period, the AP 114 transmits an association response frame (e.g., included in the PPDU 412) to the client station 134. Based on the association response frame, the client station 134 may complete the association procedure with the AP 114.

Based on processing of the authentication response frame, the client station 134 may continue the association procedure with the AP 114.

A similar procedure is performed with a reassociation procedure in which a client station seeks to rejoin a BSS, in an embodiment.

In some embodiments, the logic circuitry 192 of the LP-WUR is configured to generate the wakeup signal in response to determining that the wakeup request packet includes information that indicates that the wakeup request packet corresponds to an association procedure. In some embodiments, the logic circuitry 192 is configured to generate the wakeup signal in response to determining i) that the wakeup request packet includes information that indicates that the wakeup request packet corresponds to an association procedure, and ii) that a network address in the wakeup request packet corresponds to the wireless communication network to which the client station 134-1 is seeking to join.

In various embodiments, a wakeup request packet transmitted by an AP, such as the wakeup request packets 200, 304, or 404, includes information indicating a type of subsequent packet to be transmitted by the AP, wherein the subsequent packet is transmitted after a delay period such as described above. In some embodiments, a wakeup request packet transmitted by an AP, such as the wakeup request packets 200, 304, or 404, includes information indicating a type of procedure with which a subsequent packet is associated, wherein the subsequent packet is transmitted by the AP after a delay period such as described above. In an embodiment, the information indicating the type is included in the payload 208 of the wakeup request packet 200 (FIG. 2). For instance, the information indicating the type may be included in a low power wakeup request (LPWR) frame included in the wakeup request packet body 228.

In an embodiment, the information indicating the type in the LPWR frame indicates that a beacon frame, such as beacon frame 312, is to be transmitted by the AP 114. In an embodiment where the LPWR frame includes information indicating a beacon frame transmission, the LPWR frame may further indicate whether the beacon frame carries updated BSS parameters. In an embodiment, an LPWR frame with information indicating a subsequent beacon frame transmission is transmitted by the AP 114 prior to every beacon frame. In other embodiments, an LPWR frame with information indicating a subsequent beacon frame transmission is only transmitted prior to beacon frames that indicate updated information regarding the WLAN.

In various embodiment, the LPWR frame includes information indicating a subsequent group-addressed frame transmission to client stations 134 associated with the AP 114, includes information indicating a subsequent group addressed frame transmission to client stations 134 not associated with the AP 114, includes information indicating a subsequent group addressed frame transmission to client stations 134 associated or not associated with the AP 114. For instance, in an embodiment, LPWR frame includes information indicating that a multicast PPDU, such as a PPDU 412, is to be transmitted by the AP 114. In various embodiments, the LPWR frame includes information further indicating that the multicast PPDU is intended for client stations 134 associated with the AP 114, includes information further indicating that the multicast PPDU is intended for client stations 134 not associated with the AP 114, includes information further indicating that the multicast PPM is intended for all client stations 134 whether associated or not associated with the AP 114. In another embodiment, the LPWR frame includes information indicating that a unicast PPDU, such as a PPDU 412, is to be transmitted by the AP 114.

In various embodiments, the LPWR frame includes information indicating that the AP 114 has recovered following a restart and/or indicates that a new BSS color corresponding to the BSS is being or will be used. In an embodiment, the LPWR frame further includes information indicating one or both of identifier last-used BSS color and a new BSS color. In an embodiment, the LPWR frame includes information indicating that a beacon frame with a new BSS color identifier is to be transmitted following the LPWR frame.

In an embodiment, the LPWR frame includes information indicating that the LPWR corresponds to an association procedure. For example, based on includes information included in the LPWR frame, the client station 134 determines that a response to an association request frame (previously transmitted by the client station 134) is about to be transmitted by the AP 114 following the LPWR frame, FIG. 6 is a block diagram of an example LPWR frame 500, according to an embodiment. The LPWR frame 500 is included in a payload (e.g., the payload 208) of a wakeup request packet (e.g., the wakeup request packet 200) transmitted by an AP 114. The number above each field indicates an example number of bits occupied by the corresponding field. In other embodiments, one or more of the fields consists of another suitable number of bits. In some embodiments, one or more of the fields is omitted and/or one or more additional fields are included.

The LPWR frame 500 includes type field 502, a BSS color field 504, an AID field 506, a reserved field 508, and frame check sequence (FCS) field 510.

The type field 502 indicates a type of packet to be transmitted by the AP 114 following the wakeup request packet, as discussed above, in an embodiment. The type field 502 indicates a type of procedure to which the packet, to be transmitted by the AP 114 following the wakeup request packet, corresponds, in an embodiment. In an embodiment, the value of the type field 502 is selected from a set of multiple values corresponding to a set of multiple different types of packets/procedures. In various embodiments, the set of different types comprises any suitable combination of two or more of the following: i) a beacon frame is to follow the wakeup request packet, ii) a beacon frame with updated BSS parameters is to follow the wakeup request packet, iii) a beacon frame without updated BSS parameters is to follow the wakeup request packet, iv) a group-addressed frame for associated client stations is to follow the wakeup request packet, v) a group-addressed frame for unassociated client stations is to follow the wakeup request packet, vi) a group-addressed frame for associated and unassociated client stations is to follow the wakeup request packet, vii) a broadcast frame is to follow the wakeup request packet, viii) a unicast frame is to follow the wakeup request packet, ix) a frame corresponding to an association procedure is to follow the wakeup request packet, x) a beacon frame in connection with a restart of the AP, xi) a beacon frame in connection with a recovery of the AP, xi) a beacon frame in connection with a restart or a recovery of the AP, etc.

In some embodiments, the logic circuitry 192 of the LP-WUR 150 is configured to generate the wakeup signal in response to determining that the type field 502 includes information that indicates i) that the wakeup request packet corresponds to a type of a subsequent packet and/or ii) that the subsequent packet corresponds to a type of procedure, for which the network interface device 142 should transition to the active state. In some embodiments, the logic circuitry 192 is configured to generate the wakeup signal in response to i) analyzing information in the type field 502, and ii) determining that a network address in the AID field 506 corresponds to the client station 134-1. In some embodiments, the logic circuitry 192 is configured to generate the wakeup signal in response to i) analyzing information in the type field 502, ii) determining that a network address in the AID field 506 corresponds to the client station 134-1, and iii) determining that information in the color field 504 indicates the wakeup request packet corresponds to a wireless communication network to which the client station 134-1 belongs or is seeking to join. In some embodiments, the logic circuitry 192 of the LP-WUR 150 is configured to provide to the network interface device 142, in addition to the wakeup signal, information that indicates the type of the subsequent packet and/or ii) the type of procedure to which the subsequent packet corresponds.

The BSS color field 504 indicates a BSS color of the BSS corresponding to the AP 114.

In some embodiments, a value of the AID field 506 includes an AID of a client station 134 to which the LPWR is intended. An AID is a network identifier. In an embodiment, when a client station joins a WLAN (e.g., becomes associated with the BSS), the AP assigns an AID to the client station and informs the client station of the assigned AID. In some embodiments, an AP assigns an AID to a group of client stations (group AID, multicast AID, etc.) to be used for multicast or multi-user transmissions to the group of client stations. In some embodiments, one or more AIDs are reserved as broadcast AIDS to indicate broadcast transmissions.

In some embodiments, the AID field 506 is used to indicate a type of packet to be transmitted by the AP 114 following the wakeup request packet, as discussed above, in an embodiment. The AID field 506 indicates a type of procedure to which the packet, to be transmitted by the AP 114 following the wakeup request packet, corresponds, in an embodiment. For example, one or more AID values and/or one or more ranges of AID values are reserved for indicating types of a packet to follow the wakeup request packet, types of procedures associated with a packet to follow the wakeup request packet, etc. In an embodiment, a value of the AID field 506 is selected from a set of multiple values corresponding to a set of multiple different types of packets/procedures. In various embodiments, the set of different types comprises any suitable combination of two or more of the following: i) a beacon frame is to follow the wakeup request packet, ii) a beacon frame with updated BSS parameters is to follow the wakeup request packet, iii) a beacon frame without updated BSS parameters is to follow the wakeup request packet, iv) a group-addressed frame for associated client stations is to follow the wakeup request packet, v) a group-addressed frame for unassociated client stations is to follow the wakeup request packet, vi) a group-addressed frame for associated and unassociated client stations is to follow the wakeup request packet, vii) a broadcast frame is to follow the wakeup request packet, viii) a unicast frame is to follow the wakeup request packet, ix) a frame corresponding to an association procedure is to follow the wakeup request packet, x) a beacon frame in connection with a restart of the AP, xi) a beacon frame in connection with a recovery of the AP, xi) a beacon frame in connection with a restart or a recovery of the AP, etc.

The FCS field 510 includes an error detecting code that enables a receiving device to determine whether the LPWR frame 500 was received without any errors.

In some embodiments, the logic circuitry 192 of the LP-WUR 150 is configured to generate the wakeup signal in response to determining that the AID field 506 includes information that indicates i) that the wakeup request packet corresponds to a type of a subsequent packet and/or ii) that the subsequent packet corresponds to a type of procedure, for which the network interface device 142 should transition to the active state. In some embodiments, the logic circuitry 192 is configured to generate the wakeup signal in response to i) analyzing information in the AID field 506, and determining that information in the color field 504 indicates the wakeup request packet corresponds to a wireless communication network to which the client station 134-1 belongs or is seeking to join. In some embodiments, the logic circuitry 192 of the LP-WUR 150 is configured to provide to the network interface device 142, in addition to the wakeup signal, information that indicates the type of the subsequent packet and/or ii) the type of procedure to which the subsequent packet corresponds.

In an embodiment, an AP 114 may be capable of supporting multiple BSSs simultaneously (sometimes referred to as "virtual BSSs"). In such embodiments, different virtual BSS's are assigned different BSSIDs, each BSSID corresponding to a different virtual BSS associated with the AP 114. In some embodiments, the multiple "virtual" APs all share a common BSS color identifier. In such embodiments, the AID field may indicate a i) broadcast PPDU or a multicast PPDU for client stations 134 associated with a single virtual APs, or ii) broadcast PPDU or a multicast PPDU for all client stations 134 associated with different virtual APs. In some embodiments, the multiple "virtual" APs all have different corresponding BSS color identifiers. Broadcast PPDU or a multicast PPDU for all client stations 134 associated with different virtual APs may be indicated by using a specific BSS color identifier in the BSS color field 504.

In other embodiments, the type field 502 is omitted from the LPWR frame and a type of the subsequent packet to be transmitted by the AP is indicated by the AID field 506. For example, FIG. 7 is a block diagram of another example LPWR frame 600, according to another embodiment. The LPWR frame 600 is included in a payload (e.g., the payload 208) of a wakeup request packet (e.g., the wakeup request packet 200) transmitted by an AP 114. The number above each field indicates an example number of bits occupied by the corresponding field. In other embodiments, one or more of the fields consists of another suitable number of bits. In some embodiments, one or more of the fields is omitted and/or one or more additional fields are included.

The LPWR frame 600 includes a BSS color field 602, an AID field 604, and an FCS field 606.

The BSS color field 602 indicates a BSS color of the BSS corresponding to the AP 114.

The AID field 604 includes an AID of a client station 134 to which the LPWR is intended, at least when a packet to follow the wakeup request packet is a unicast packet intended for the client station 134. In some embodiments, the AID field 604 is used to indicate a type of packet to be transmitted by the AP 114 following the wakeup request packet, as discussed above, in an embodiment. The AID field 604 indicates a type of procedure to which the packet, to be transmitted by the AP 114 following the wakeup request packet, corresponds, in an embodiment. For example, one or more AID values and/or one or more ranges of AID values are reserved for indicating types of a packet to follow the wakeup request packet, types of procedures associated with a packet to follow the wakeup request packet, etc. In an embodiment, a value of the AID field 604 is selected from a set of multiple values corresponding to a set of multiple different types of packets/procedures. In various embodiments, the set of different types comprises any suitable combination of two or more of the following: a beacon frame is to follow the wakeup request packet, ii) a beacon frame with updated BSS parameters is to follow the wakeup request packet, iii) a beacon frame without updated BSS parameters is to follow the wakeup request packet, iv) a group-addressed frame for associated client stations is to follow the wakeup request packet, v) a group-addressed frame for unassociated client stations is to follow the wakeup request packet, vi) a group-addressed frame for associated and unassociated client stations is to follow the wakeup request packet, vii) a broadcast frame is to follow the wakeup request packet, viii) a unicast frame is to follow the wakeup request packet, ix) a frame corresponding to an association procedure is to follow the wakeup request packet, x) a beacon frame in connection with a restart of the AP, xi) a beacon frame in connection with a recovery of the AP, xi) a beacon frame in connection with a restart or a recovery of the AP, etc.

When AID field 604 indicates a recovery/restart of the AP 114, the BSS color field 602 may indicate a new BSS color of the BSS or a last-used BSS color of the BSS.

The FCS field 606 includes an error detecting code that enables a receiving device to determine whether the LPWR frame 600 was received without any errors.

In some embodiments, the logic circuitry 192 of the LP-WUR 150 is configured to generate the wakeup signal in response to determining that the AID field 604 includes i) a network address that corresponds to the client station 134-1, ii) information that indicates that the wakeup request packet corresponds to a type of a subsequent packet, and/or iii) information that indicates that the subsequent packet corresponds to a type of procedure, for which the network interface device 142 should transition to the active state. In some embodiments, the logic circuitry 192 is configured to generate the wakeup signal in response to i) analyzing information in the AID field 604, and ii) determining that information in the color field 602 indicates the wakeup request packet corresponds to a wireless communication network to which the client station 134-1 belongs or is seeking to join. In some embodiments, the logic circuitry 192 of the LP-WUR 150 is configured to provide to the network interface device 142, in addition to the wakeup signal, information that indicates the type of the subsequent packet and/or ii) the type of procedure to which the subsequent packet corresponds.

Figure 8:
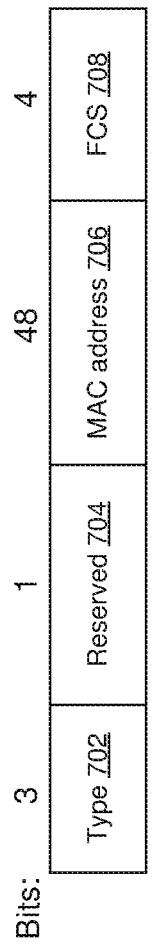
FIG. 8 is a block diagram of another example payload in a wakeup request packet, according to an embodiment.

FIG. 8 is a block diagram of another example LPWR frame 700, according to an embodiment. The LPWR frame 700 is included in a payload (e.g., the payload 208) of a wakeup request packet (e.g., the wakeup request packet 200) transmitted by an AP 114. The number above each field indicates an example number of bits occupied by the corresponding field. In other embodiments, one or more of the fields consists of another suitable number of bits. In some embodiments, one or more of the fields is omitted and/or one or more additional fields are included.

The LPWR frame 700 includes a type field 702, a reserved field 704, a MAC address field 706, and an FCS field 708. In some embodiments, the type field 702 is used to indicate a type of the subsequent packet to be transmitted by an AP and/or a type of procedure to which the corresponding subsequent packet corresponds, such as described above with respect to FIG. 6.

In an embodiment, a MAC address of a client station 134 is included in the MAC address field 706 when the subsequent packet is a unicast PPDU to the client station 134. In an embodiment a MAC address of the AP 114 is included in the MAC address field 706 when the subsequent packet is a multicast PPDU or a broadcast PPDU.

The FCS field 708 includes an error detecting code that enables a receiving device to determine whether the LPWR frame 700 was received without any errors.

In some embodiments, the logic circuitry 192 of the LP-WUR 150 is configured to generate the wakeup signal in response to determining that the type field 702 includes information that indicates i) that the wakeup request packet corresponds to a type of a subsequent packet and/or ii) that the subsequent packet corresponds to a type of procedure, for which the network interface device 142 should transition to the active state. In some embodiments, the logic circuitry 192 is configured to generate the wakeup signal in response to i) analyzing information in the type field 702, and ii) determining that a network address in the address field 706 corresponds to the client station 134-1. In some embodiments, the logic circuitry 192 of the LP-WUR 150 is configured to provide to the network interface device 142, in addition to the wakeup signal, information that indicates the type of the subsequent packet and/or ii) the type of procedure to which the subsequent packet corresponds.

Figure 9:
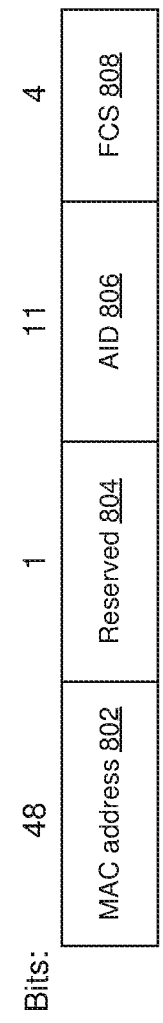
FIG. 9 is a block diagram of another example payload in a wakeup request packet, according to an embodiment.

FIG. 9 is a block diagram of another example LPWR frame 800, according to another embodiment. The LPWR frame 800 is included in a payload (e.g., the payload 208) of a wakeup request packet (e.g., the wakeup request packet 200) transmitted by an AP 114. The number above each field indicates an example number of bits occupied by the corresponding field. In other embodiments, one or more of the fields consists of another suitable number of bits. In some embodiments, one or more of the fields is omitted and/or one or more additional fields are included.

The LPWR frame 800 includes a MAC address field 802, a reserved field 804, an AID field 806, and an FCS field 708.

The MAC address field 802 indicates the MAC address of the AP 114 transmitting the LPWR frame 800, according to an embodiment.

The AID field 806 indicates an address of a client station 134 or a type of packet/procedure of/corresponding to a subsequent packet transmitted by the AP 114, as discussed above.

The FCS field 708 includes an error detecting code that enables a receiving device to determine whether the LPWR frame 808 was received without any errors.

In some embodiments, the logic circuitry 192 of the LP-WUR 150 is configured to generate the wakeup signal in response to determining that the AID field 806 includes i) a network address that corresponds to the client station 134-1, ii) information that indicates that the wakeup request packet corresponds to a type of a subsequent packet, and/or iii) information that indicates that the subsequent packet corresponds to a type of procedure, for which the network interface device 142 should transition to the active state. In some embodiments, the logic circuitry 192 is configured to generate the wakeup signal in response to i) analyzing information in the AID field 806, and ii) determining that a network address in the address field 802 indicates the wakeup request packet corresponds to an AP of a wireless communication network to which the client station 134-1 belongs or is seeking to join. In some embodiments, the logic circuitry 192 of the LP-WUR 150 is configured to provide to the network interface device 142, in addition to the wakeup signal, information that indicates the type of the subsequent packet and/or ii) the type of procedure to which the subsequent packet corresponds.

FIG. 10 is a flow diagram of an example method 900 for transmitting a first packet to prompt a network interface device of another communication device to transition to an active state to receive a second packet, according to an embodiment. In some embodiments, the network interface device 122 of FIG. 1 is configured to implement the method 900. The method 900 is described in the context of the network interface device 122 merely for explanatory purposes and, in other embodiments, the method 900 is implemented by another suitable device.

At block 904, the network interface device 122 determines (e.g., the MAC processor 160 determines) a first time at which a first packet is to be transmitted by a first communication device (e.g., the AP 114) associated with the network interface device 122, such that an end of transmission of the first packet occurs at least a delay period prior to a second time at which transmission of a second packet is scheduled to begin. The first packet includes a wakeup request packet configured to prompt a wakeup radio at a second communication device (e.g., the client station 134) to prompt a network interface device of the second communication device to transition to an active state in which the network interface device is ready to receive the second packet, according to an embodiment. In an embodiment, the delay period corresponds to a time required at the second communication device to transition from a low power state to the active state.

At block 908, the network interface device 122 transmits the first packet at the determined first time. In an embodiment, the first packet has a format such as described with respect to FIG. 2. In other embodiments, the first packet has another suitable format. In various embodiments, the first packet includes an LPWR frame as described above with reference to any of FIGS. 5-8. In other embodiments, the first packet includes another suitable MAC frame, e.g., in a payload of the first packet.

At block 912, the network interface device 122 transmits the second packet at least a delay period after an end of transmission of the first packet.

In some embodiments, the second packet includes a beacon frame. In some embodiments in which the second packet includes a beacon frame, the first packet includes information that indicates the second packet includes a beacon frame.

In some embodiments, the beacon frame corresponds to beacon frame transmitted in connection with the network interface device 122 performing a restart procedure and/or recovery procedure, and the first packet includes information that indicates the second packet includes a beacon frame corresponding to a restart procedure and/or recovery procedure.

In some embodiments, the first packet includes information that indicates a new network identifier (e.g., a new color) corresponding to a wireless communication network, and the second packet includes information that indicates the new network identifier. In some embodiments, the second packet also includes information that indicates a network identifier last used by an AP of the wireless communication network.

In some embodiments, the second packet includes a frame that indicates a change in one or more operating parameters of a wireless communication network. In some embodiments in which the second packet includes a frame that indicates a change in one or more operating parameters of a wireless communication network, the first packet includes information that indicates the second packet includes a frame that indicates a change in one or more operating parameters of the wireless communication network. In some embodiments, the frame that indicates the change in one or more operating parameters is a beacon frame.

Figure 11:
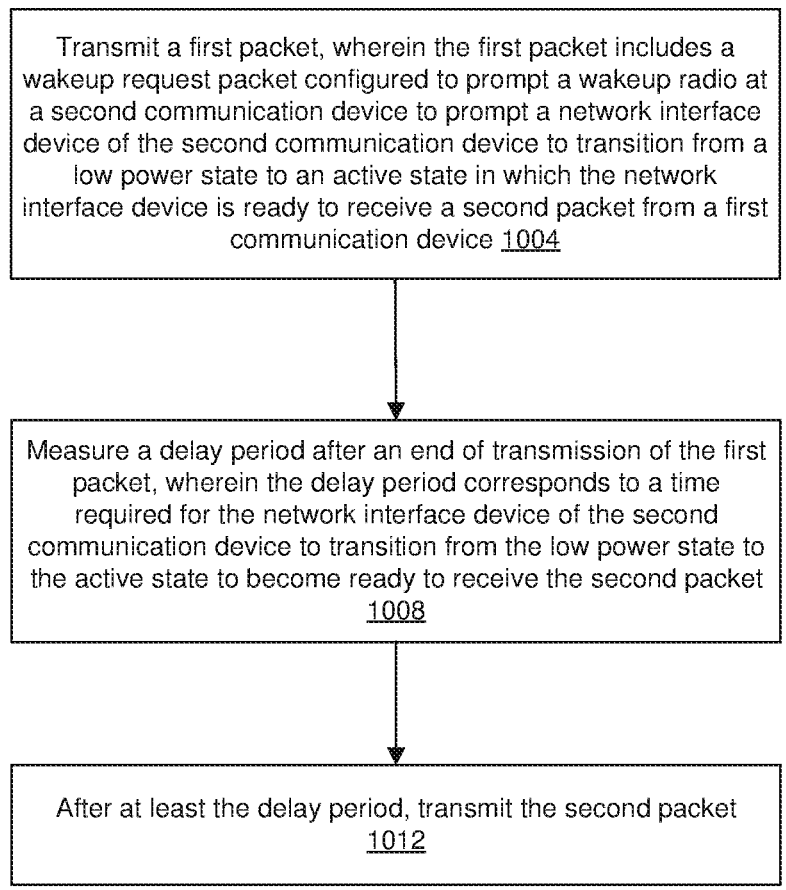
FIG. 11 is a flow diagram of another example method of transmitting a first packet to prompt a network interface device of another communication device to transition to an active state to receive a second packet, according to an embodiment.

FIG. 11 is a flow diagram of an example method 1000 for transmitting a first packet to prompt a network interface device of another communication device to transition to an active state to receive a second packet, according to an embodiment. In some embodiments, the network interface device 122 of FIG. 1 is configured to implement the method 1000. The method 1000 is described in the context of the network interface device 122 merely for explanatory purposes and, in other embodiments, the method 1000 is implemented by another suitable device.

At block 1004, the network interface device 122 transmits a first packet, wherein the first packet includes a wakeup request packet configured to prompt a wakeup radio at a second communication device, such as a client station 134, to prompt a network interface device of the second communication device to transition from a low power state to an active state in which the network interface device is ready to receive a second packet from a first communication device. In an embodiment, the first packet has a format such as described with respect to FIG. 2. In other embodiments, the first packet has another suitable format. In various embodiments, the first packet includes an LPWR frame as described above with reference to any of FIGS. 5-8. In other embodiments, the first packet includes another suitable MAC frame, e.g., in a payload of the first packet.

In some embodiments, the wakeup request packet is configured to prompt multiple respective wakeup radios of multiple communication devices (including the second communication device) to prompt respective network interface devices of the multiple communication devices to transition from a low power state to an active state in which the respective network interface devices are ready to receive the second packet.

At block 1008, the network interface device 122 measures a delay period after an end of transmission of the first packet, wherein the delay period corresponds to a time required for the network interface device of the second communication device to transition from the low power state to the active state to become ready to receive the second packet.

At block 1012, the network interface device 122 transmits the second packet to the second communication device at least a delay period after an end of transmission of the first packet. In some embodiments, the network interface device 122 transmits the second packet responsive to determining that the delay period has ended.

In some embodiments, the network interface device 122 transmits the second packet to a group of communication devices that includes the second communication device.

In some embodiments, the second packet corresponds to a unicast packet. In some embodiments in which the second packet corresponds to a unicast packet, the first packet includes a network address of the second communication device.

In some embodiments, the second packet corresponds to a multicast packet. In some embodiments in which the second packet corresponds to a multicast packet, the first packet includes a network address corresponding to a group of communication devices that includes the second communication device.

In some embodiments, the second packet corresponds to a broadcast packet. In some embodiments in which the second packet corresponds to a broadcast packet, the first packet includes a broadcast network address.

In some embodiments, the second packet corresponds to a beacon frame transmitted in connection with the network interface device 122 performing a restart procedure and/or recovery procedure, and the first packet includes information that indicates the second packet includes a beacon frame corresponding to a restart procedure and/or recovery procedure.

In some embodiments, the first packet includes information that indicates a new network identifier (e.g., a new color) corresponding to a wireless communication network, and the second packet includes information that indicates the new network identifier. In some embodiments, the second packet also includes information that indicates a network identifier last used by an AP of the wireless communication network.

In some embodiments, the second packet includes a frame that indicates a change in one or more operating parameters of a wireless communication network. In some embodiments in which the second packet includes a frame that indicates a change in one or more operating parameters of a wireless communication network, the first packet includes information that indicates the second packet includes a frame that indicates a change in one or more operating parameters of the wireless communication network. In some embodiments, the frame that indicates the change in one or more operating parameters is a beacon frame.

In some embodiments, the first packet includes information that indicates the second packet corresponds to an association procedure. In some embodiments in which the first packet includes information that indicates the second packet corresponds to an association procedure, the second packet includes an authentication response frame or an association response frame.

Figure 12:
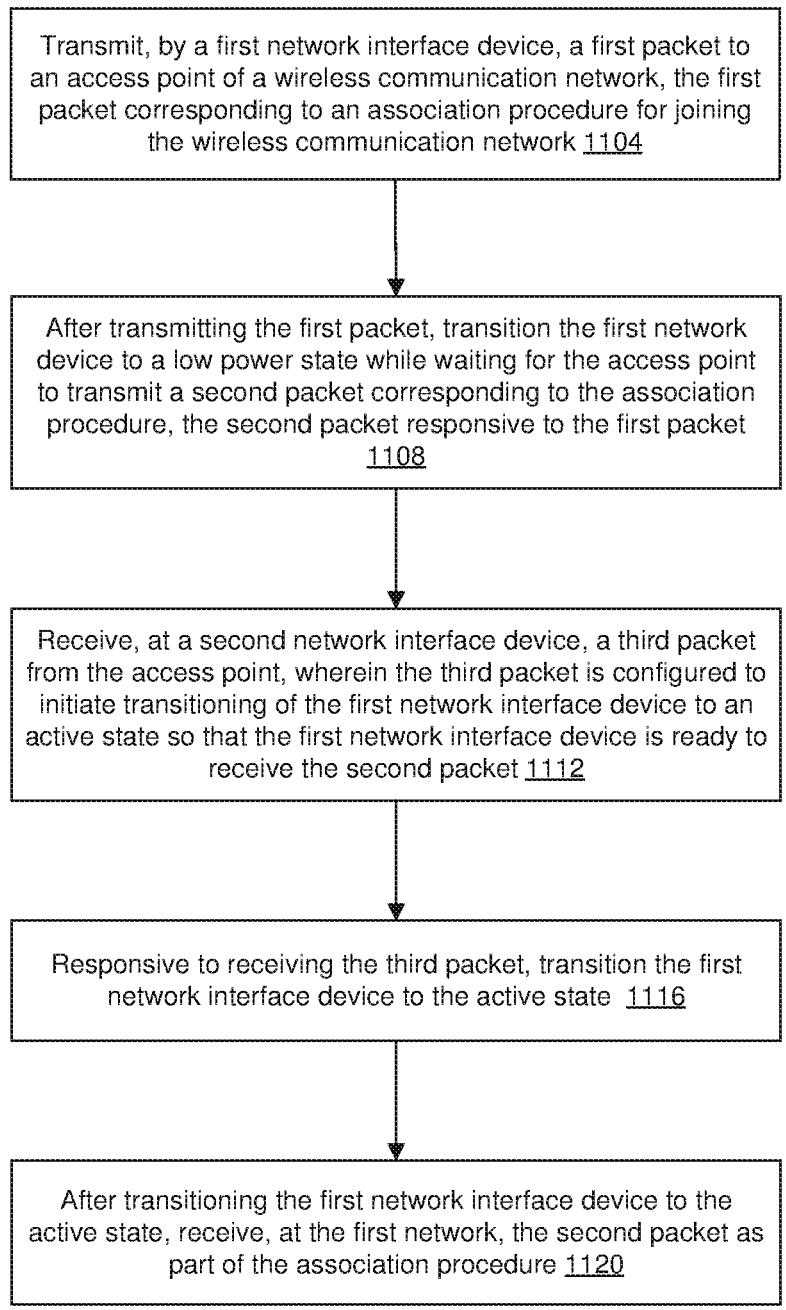
FIG. 12 is a flow diagram of an example method for joining a wireless communication network, according to an embodiment.

FIG. 12 is a flow diagram of an example method 1100 for joining a wireless communication network, according to an embodiment. In some embodiments, the client station 134-1 is configured to implement the method 1100. The method 1100 is described in the context of the client station 134-1 merely for explanatory purposes and, in other embodiments, the method 1100 is implemented by another suitable communication device.

At block 1104, a first network interface device (e.g., the network interface device 142) of the client station 134 transmits a first packet to an AP of a wireless communication network, wherein the first packet corresponds to an association procedure for joining the wireless communication network. In an embodiment, the first packet includes an authentication request frame. In another embodiment, the first packet includes an association request frame. In another embodiment, the first packet includes a reauthentication request frame. In another embodiment, the first packet includes a reassociation request frame. In other embodiments, the first packet includes another suitable MAC frame used in an association procedure for joining a wireless communication network.

At block 1108, the first network interface device transitions to a low power state after transmitting the first packet. The first network interface device transitions to the low power state while waiting for the AP to transmit a second packet corresponding to the association procedure, and wherein the second packet responsive to the first packet, according to an embodiment. In an embodiment in which the first packet includes an authentication request frame, the second packet will include an authentication response frame. In an embodiment in which the first packet includes an association request frame, the second packet will include an association response frame. In another embodiment in which the first packet includes a reauthentication request frame, the second packet will include a reauthentication response frame. In another embodiment in which the first packet includes a reassociation request frame, the second packet will include a reassociation response frame. In other embodiments, the second packet will include another suitable MAC frame used in an association procedure for joining a wireless communication network.

At block 1108, a second network interface device (e.g., the LP-VUR 150) receives a third packet from the AP, wherein the third packet corresponds to a wakeup request packet configured to prompt the first network interface device to transition from the low power state to an active state in which the first network interface device is ready to receive the second packet from the AP. In an embodiment, the third packet has a format such as described with respect to FIG. 2. In other embodiments, the third packet has another suitable format. In various embodiments, the third packet includes an LPWR frame as described above with reference to any of FIGS. 5-8. In other embodiments, the third packet includes another suitable MAC frame, e.g., in a payload of the third packet.

At block 1116, the client station 134-1 transitions the first network device to the active state in response to receiving the third packet. For example, in an embodiment, the LP-WUR 150 processes the third packet and, responsive to processing the third packet, generates the wakeup signal to prompt the first network device to transition to the active state.

After the first network device is transitioned to the active state in response to receiving the third packet, the first network device receiving the second packet from the AP as part of the association procedure. In an embodiment in which the first packet includes an authentication request frame, the second packet includes an authentication response frame. In an embodiment in which the first packet includes an association request frame, the second packet includes an association response frame. In another embodiment in which the first packet includes a reauthentication request frame, the second packet includes a reauthentication response frame. In another embodiment in which the first packet includes a reassociation request frame, the second packet includes a reassociation response frame. In other embodiments, the second packet includes another suitable MAC frame used in an association procedure for joining a wireless communication network.

Figure 13:
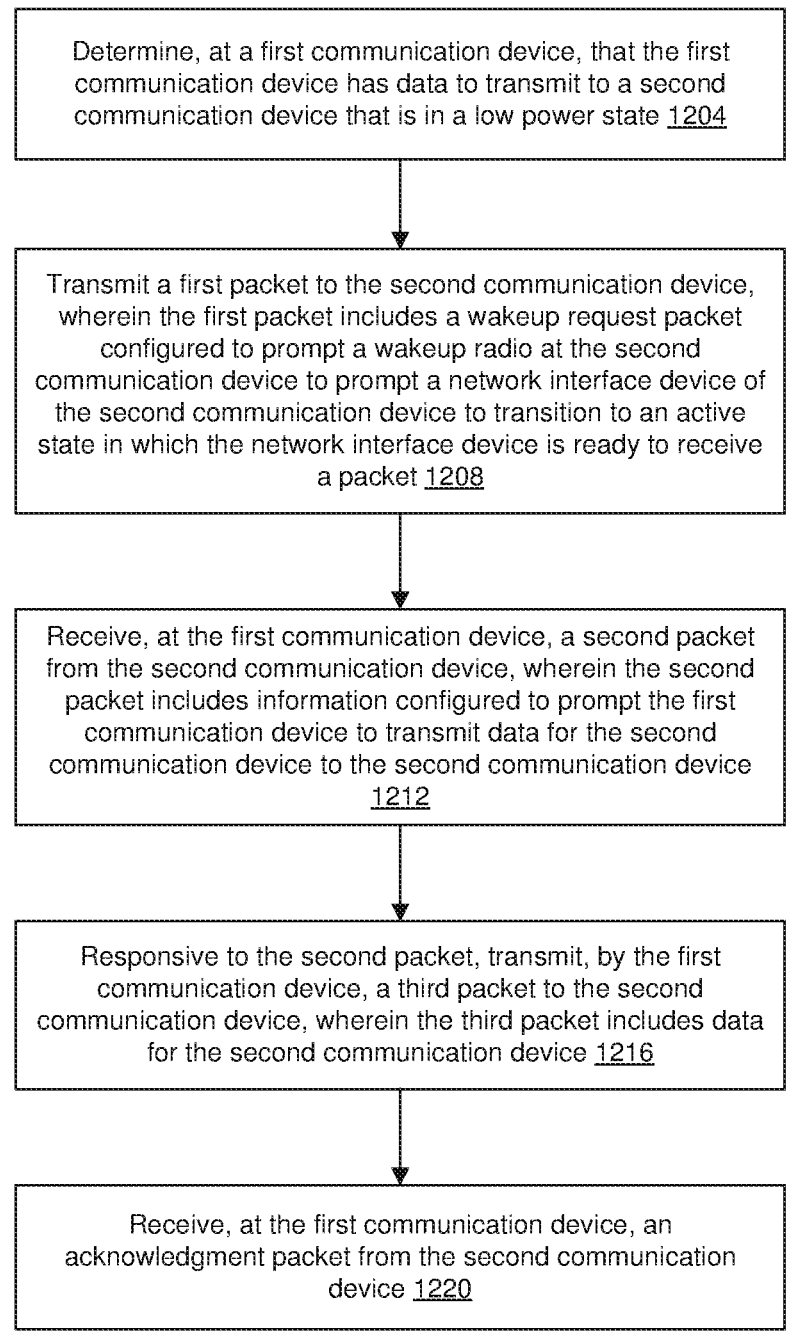
FIG. 13 is a flow diagram of an example method for a first communication device to transmit data to a second communication device that is initially in a low power state, according to an embodiment.

FIG. 13 is a flow diagram of an example method 1200 for a first communication device to transmit data to a second communication device that is initially in a low power state, according to an embodiment. In some embodiments, the AP 114 is configured to implement the method 1200. The method 1200 is described in the context of the AP 114 merely for explanatory purposes and, in other embodiments, the method 1200 is implemented by another suitable communication device. In an embodiment, the method 1200 corresponds to actions taken by the AP 114 as described in connection with FIG. 3.

At block 1204, the first communication device (e.g., the network interface device 122 of the AP 114) determines that the first communication device has data to transmit to a second communication device (e.g., the client station 134), which is in a low power state. For example, the first communication device (e.g., the network interface device 122 of the AP 114) determines that there is data for the second communication device stored in a buffer (e.g., in a memory device of the network interface device 122).

At block 1208, the first communication device (e.g., the network interface device 122 of the AP 114) transmits to the second communication device a wakeup request packet to prompt a wakeup radio at the second communication device to prompt a network interface device of the second communication device to transition to an active state in which the network interface device is ready to receive a packet. In an embodiment, the wakeup request packet is the example wakeup request packet 200 of FIG. 2. In other embodiments, the wakeup request packet has another suitable format. In an embodiment, block 1208 is performed in response to the determination at block 1204 that the first communication device has data to transmit to that second communication device, and when the first communication device has determined that the network interface device of the second communication device is in the low power state. In an embodiment, the first communication device determines that the network interface device of the second communication device is in the low power state based on receiving a packet from the network interface device of the second communication device, wherein the packet indicates that the network interface device of the second communication device is transitioning to the low power state.

At block 1212, the first communication device (e.g., the network interface device 122 of the AP 114) receives a second packet from the second communication device, wherein the second packet includes information configured to prompt the first communication device to transmit data for the second communication device to the second communication device. For example, the second packet includes a PS-Poll frame, where the first communication device (e.g., the network interface device 122 of the AP 114) is configured to transmit data (e.g., that has been stored in a buffer) for the second communication device to the second communication device in response to receiving a PS-Poll frame from the second communication device, according to an embodiment. As another example, the second packet includes a QoS Null frame, where the first communication device (e.g., the network interface device 122 of the AP 114) is configured to transmit data (e.g., that has been stored in a buffer) for the second communication device to the second communication device in response to receiving a QoS Null frame from the second communication device, according to an embodiment. As another example, the second packet includes an RTS frame, where the first communication device (e.g., the network interface device 122 of the AP 114) is configured to transmit data (e.g., that has been stored in a buffer) for the second communication device to the second communication device in response to receiving an RTS frame from the second communication device, according to an embodiment.

At block 1216, the first communication device (e.g., the network interface device 122 of the AP 114) transmits a third packet to the second communication device in response to receiving the second packet at block 1212, wherein the third packet includes information (e.g., that was stored in the buffer) for the second communication device. Block 1216 includes the MAC processor 160 generating an MPDU that includes the information for the second communication device, and the PITY processor 164 generating a PPDU that includes the MPDU, according to an embodiment. In an embodiment, the MPDU is a unicast MPDU and the PPDU is an SU PPDU that is transmitted as an SU transmission.

At block 1220, the first communication device (e.g., the network interface device 122 of the AP 114) receives an acknowledgement packet from the second communication device, where the acknowledgement packet acknowledges that the second communication device successfully received the third packet transmitted at block 1216. In an embodiment, the acknowledgement packet comprises a PPDU that includes an ACK frame.

Figure 14:
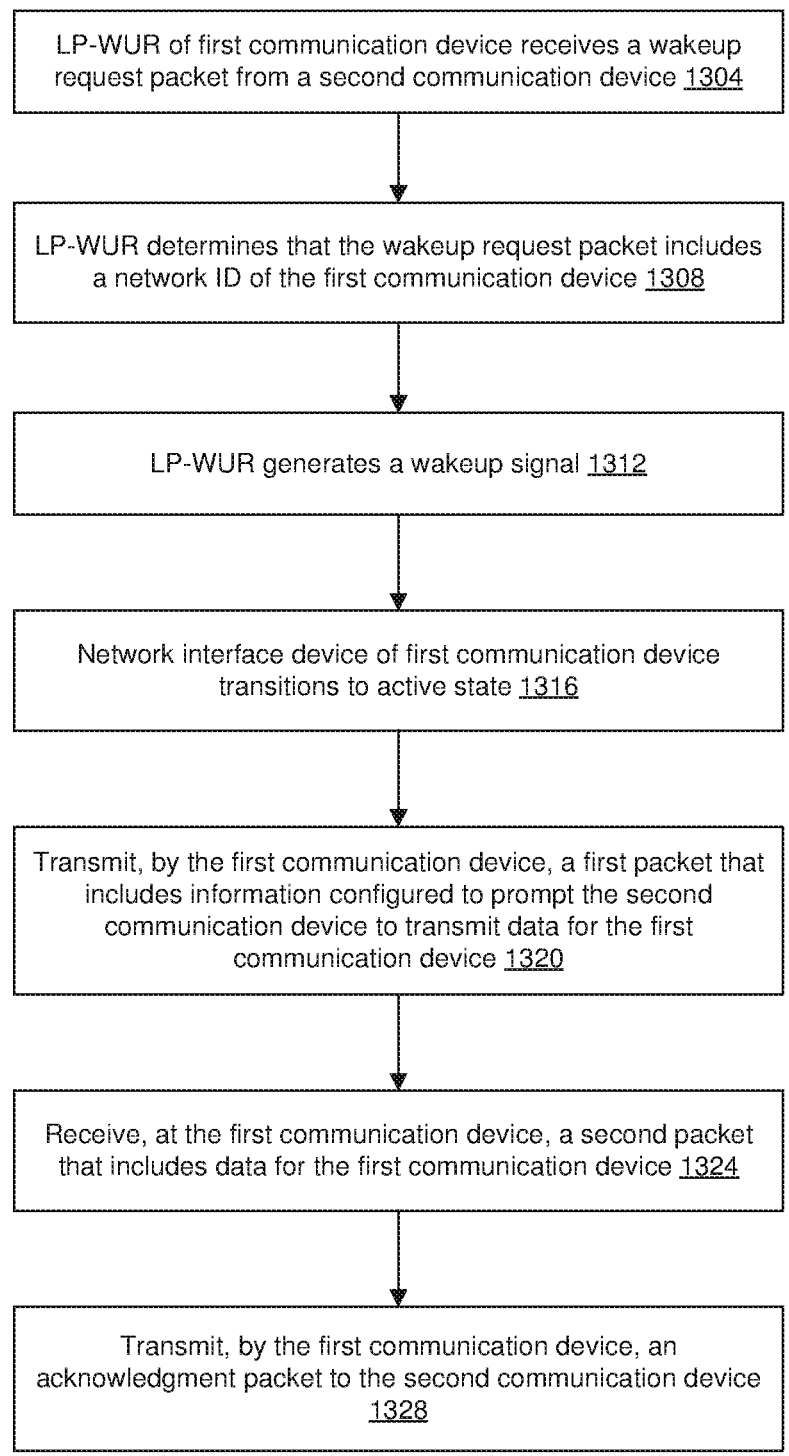
FIG. 14 is a flow diagram of an example method for a first communication device to receive data from a second communication device after a network interface device of the first communication device transitions from a low power state to an active state, according to an embodiment.

FIG. 14 is a flow diagram of an example method 1300 for a first communication device to receive data from a second communication device after transitioning from a low power state to an active state, according to an embodiment. In some embodiments, the client station 134 is configured to implement the method 1300. The method 1300 is described in the context of the client station 134 merely for explanatory purposes and, in other embodiments, the method 1300 is implemented by another suitable communication device. In an embodiment, the method 1300 corresponds to actions taken by the client station 134 as described in connection with FIG. 3.

At block 1304, an LP-WUR of the first communication device (e.g., the LP-WUR 150 of the client station 134) receives a wakeup request packet. In an embodiment, the wakeup request packet is the example wakeup request packet 200 of FIG. 2. In other embodiments, the wakeup request packet has another suitable format. The wakeup request packet is received when a network interface device of the first communication device (e.g., the network interface device 142 of the client station 134) is in a low power state.

At block 1308, the LP-WUR (e.g., the LP-WUR 150) determines that the wakeup request packet includes a network identifier of the first communication device.

At block 1312, the LP-WUR (e.g., the LP-WUR 150) generates a wakeup signal to prompt the network interface device of the first communication device (e.g., the network interface device 142 of the client station 134) to transition from the low power state to an active state.

At block 1316, the network interface device of the first communication device (e.g., the network interface device 142 of the client station 134) transitions from the low power state to the active state in response to receiving the wakeup signal.

At block 1320, the first communication device (e.g., the network interface device 122 of the AP 114) transmits a first packet to the second communication device, wherein the first packet includes information configured to prompt the second communication device to transmit data for the first communication device to the first communication device. For example, the first packet includes a PS-Poll frame, where the second communication device (e.g., the network interface device 122 of the AP 114) is configured to transmit data (e.g., that has been stored in a buffer of the network interface device 122) for the first communication device to the first communication device in response to receiving a PS-Poll frame from the first communication device, according to an embodiment. As another example, the first packet includes a QoS Null frame, where the second communication device (e.g., the network interface device 122 of the AP 114) is configured to transmit data (e.g., that has been stored in a buffer) for the first communication device to the first communication device in response to receiving a QoS Null frame from the first communication device, according to an embodiment. As another example, the first packet includes an RTS frame, where the second communication device (e.g., the network interface device 122 of the AP 114) is configured to transmit data (e.g., that has been stored in a buffer) for the first communication device to the first communication device in response to receiving an RTS frame from the first communication device, according to an embodiment.

In an embodiment, the first communication device (e.g., the network interface device 122 of the AP 114) transmits the first packet in response to receiving the wakeup signal and after transitioning to the active state.

At block 1324, the first communication device (e.g., the network interface device 142 of the client station 134) receives a second packet from the second communication device. In an embodiment, the second packet is responsive to the first packet transmitted at block 1320. The second packet includes information (e.g., that was stored in the buffer of the second communication device) for the first communication device. In an embodiment, the second packet include an MPDU having the information for the first communication device. In an embodiment, the MPDU is a unicast MPDU and the second packet corresponds to an SU PPDU that was transmitted as an SU transmission.

At block 1328, the first communication device (e.g., the network interface device 122 of the AP 114) transmits an acknowledgement packet to the second communication device, where the acknowledgement packet acknowledges that the first communication device successfully received the second packet (block 1324). In an embodiment, the acknowledgement packet comprises a PPDU that includes an ACK frame.

Embodiment 1

A method, comprising: determining, at a first communication device, a first time at which a first packet is to be transmitted by the first communication device such that an end of transmission of the first packet occurs at least a delay period prior to a second time at which transmission of a second packet is scheduled to begin, wherein the first packet includes a wakeup request packet configured to prompt a wakeup radio at a second communication device to prompt a network interface device of the second communication device to transition to an active state in which the network interface device is ready to receive the second packet; transmitting, by the first communication device, the first packet at the determined first time; and transmitting, by the first communication device, the second packet at least the delay period after an end of transmission of the first packet.

Embodiment 2

The method of embodiment it, wherein the delay period corresponds to a time required for the second network interface device to transition from a low power state to the active state.

Embodiment 3

The method of either of embodiments 1 or 2, wherein: the second packet includes a beacon frame; and the second time corresponds to a target beacon transmission time.

Embodiment 4

The method of embodiment 3, wherein: the beacon frame includes updated basic service set (BSS) parameters for a BSS corresponding to the first communication device; and the first packet includes information indicating that the second packet includes a beacon frame with updated BSS parameters.

Embodiment 5

The method of embodiment 4, wherein: the first packet includes a type field indicating one or both of i) a type of the second packet, and ii) a type of procedure to which the second packet corresponds; and the information indicating that the second packet includes the beacon frame with updated BSS parameters is included in the type field.

Embodiment 6

The method of embodiment 4, wherein: the first packet includes a network address field; and the information indicating that the second packet includes the beacon frame with updated BSS parameters is included in the network address field.

Embodiment 7

The method of any of embodiments 3-6, wherein the first packet indicates a basic service set (BSS) color identifier associated with the first communication device.

Embodiment 8

The method of any of embodiments 1-7, wherein the second packet is transmitted as a single-user transmission.

Embodiment 9

The method of any of embodiments 1-7, wherein the second packet is transmitted as a multi-user transmission.

Embodiment 10

The method of any of embodiments 1-7, wherein the second packet is a broadcast packet having a broadcast address.

Embodiment 11

An apparatus, comprising: a first network interface device associated with a first communication device, wherein the first network interface device comprises one or more integrated circuit (IC) devices configured to: determine a first time at which a first packet is to be transmitted by the first communication device such that an end of transmission of the first packet occurs at least a delay period prior to a second time at which transmission of a second packet is scheduled to begin, wherein the first packet includes a wakeup request packet configured to prompt a wakeup radio at a second communication device to prompt a second network interface device of the second communication device to transition to an active state in which the second network interface device is ready to receive the second packet, transmit the first packet at the determined first time, and transmit the second packet at least the delay period after an end of transmission of the first packet.

Embodiment 12

The apparatus of embodiment 11, wherein the delay period corresponds to a time required at the second communication device for the second network device to transition from a low power state to the active state.

Embodiment 13

The apparatus of either embodiments 11 or 12, wherein: the second packet includes a beacon frame; and the second time corresponds to a target beacon transmission time.

Embodiment 14

The apparatus of embodiment 13, wherein: the beacon frame includes updated basic service set (BSS) parameters for a BSS corresponding to the first communication device; and the first packet includes information indicating that the second packet includes a beacon frame with updated BSS parameters.

Embodiment 15

The apparatus of embodiment 14, wherein: the first packet includes a type field indicating one or both of i) a type of the second packet, and ii) a type of procedure to which the second packet corresponds; and the information indicating that the second packet includes the beacon frame with updated BSS parameters is included in the type field.

Embodiment 16

The apparatus of embodiment 14, wherein: the first packet includes a network address field; and the information indicating that the second packet includes the beacon frame with updated. BSS parameters is included in the network address field.

Embodiment 17

The apparatus of any of embodiments 13-16, wherein the first packet indicates a basic service set (BSS) color identifier associated with the first communication device.

Embodiment 18

The apparatus of any of embodiments 11-17, wherein the first network interface further comprises: a media access control layer protocol (MAC) processor implemented on the one or more IC devices; and a physical layer protocol (PHY) processor implemented on the one or more IC devices and coupled to the MAC processor.

Embodiment 19

The apparatus of any of embodiments 11-18, wherein the one or more IC devices are configured to transmit the second packet as a single-user transmission.

Embodiment 20

The apparatus of any of embodiments 11-18, wherein the one or more IC devices are configured to transmit the second packet as a multi-user transmission.

Embodiment 21

A method, comprising: transmitting, by a first communication device, a first packet, wherein the first packet includes a wakeup request packet configured to prompt a wakeup radio at a second communication device to prompt a network interface device of the second communication device to transition from a low power state to an active state in which the network interface device is ready to receive a second packet from the first communication device; measuring, at the first communication device, a delay period after an end of transmission of the first packet, wherein the delay period corresponds to a time required for the network interface device of the second communication device to transition from the low power state to the active state to become ready to receive the second packet; and after at least the delay period, transmitting, by the first communication device, the second packet.

Embodiment 22

The method of embodiment 21, further comprising: receiving, at the first communication device and from the second communication device, an indication of the time required for the network interface device of the second communication device to transition from the low power state to the active state to become ready to receive the second packet; and determining, at the first communication device, the delay period using the indication received from the second communication device.

Embodiment 23

The method of embodiment 22, wherein: receiving the indication of the time required for the network interface device of the second communication device to transition from the low power state to the active state comprises receiving a third packet that includes the indication, wherein the third packet was transmitted by the network interface device of the second communication device.

Embodiment 24

The method of embodiment 23, wherein: receiving the indication of the tune required for the network interface device of the second communication device to transition from the low power state to the active state further comprises receiving in an association request frame or a reassociation request frame in the third packet, wherein the association request frame or the reassociation request frame includes the indication.

Embodiment 25

The method of any of embodiments 21-24, further comprising: receiving, at the first communication device and from the second communication device, a third packet that corresponds to an association procedure for joining a wireless communication network managed by the first communication device, wherein the third packet is received prior to transmitting the first packet; wherein the second packet corresponds to the association procedure and is responsive to receiving the third packet.

Embodiment 26

The method of embodiment 25, wherein: the third packet includes an authentication request frame; and the second packet includes an authentication response frame.

Embodiment 27

The method of any of embodiments 21-26, wherein: the first packet includes a type field indicating one or both of i) a type of the second packet, and ii) a type of procedure to which the second packet corresponds.

Embodiment 28

The method of embodiments 21-26, wherein: the first packet includes a network address field; and the method further comprises including in the network address field information that indicates one or both of i) a type of the second packet, and ii) a type of procedure to which the second packet corresponds.

Embodiment 29

The method of embodiments 21-28, wherein: the first communication device corresponds to an access point of a wireless communication network; the first packet includes i) information that indicates that the access point has reset; and ii) a short network address of the wireless communication network that the access point is using after resetting.

Embodiment 30

The method of embodiment 29, wherein the first packet further includes a last used short network address of the wireless communication network that the access point was using prior to resetting.

Embodiment 31

An apparatus, comprising: a first network interface device associated with a first communication device, wherein the first network interface device comprises one or more integrated circuit (IC) devices configured to: transmit a first packet that includes a wakeup request packet configured to prompt a wakeup radio at a second communication device to prompt a second network interface device of the second communication device to transition from a low power state to an active state in which the second network interface device is ready to receive a second packet from the first communication device, measure a delay period after an end of transmission of the first packet, wherein the delay period corresponds to a time required for the second network interface device of the second communication device to transition from the low power state to the active state to become ready to receive the second packet, and after at least the delay period, transmit the second packet.

Embodiment 32

The apparatus of embodiment 31, wherein the one or more IC devices are further configured to: receive, from the second communication device, an indication of the time required for the second network interface device of the second communication device to transition from the low power state to the active state to become ready to receive the second packet; and determine the delay period using the indication received from the second communication device.

Embodiment 33

The apparatus of embodiment 32, wherein the one or more IC devices are further configured to: receive a third packet that includes the indication, wherein the third packet was transmitted by the network interface device of the second communication device.

Embodiment 34

The apparatus embodiment 31, wherein the one or more IC devices are further configured to: receive in an association request frame or a reassociation request frame in the third packet, wherein the association request frame or the reassociation request frame includes the indication.

Embodiment 35

The apparatus of any of embodiments 31-34, wherein the one or more IC devices are further configured to: receive, from the second communication device, a third packet that corresponds to an association procedure for joining a wireless communication network managed by the first communication device, wherein the third packet is received prior to transmitting the first packet; wherein the second packet corresponds to the association procedure and is responsive to receiving the third packet.

Embodiment 36

The apparatus of embodiment 35, wherein: the third packet includes an authentication request frame; and the second packet includes an authentication response frame.

Embodiment 37

The apparatus of any of embodiments 31-36, wherein: the first packet includes a type field indicating one or both of i) a type of the second packet, and ii) a type of procedure to which the second packet corresponds.

Embodiment 38

The apparatus of any of embodiments 31-36, wherein: the first packet includes a network address field; and the method further comprises including in the network address field information that indicates one or both of i) a type of the second packet, and ii) a type of procedure to which the second packet corresponds.

Embodiment 39

The apparatus of any of embodiments 31-38, wherein: the first communication device corresponds to an access point of a wireless communication network; the first packet includes i) information that indicates that the access point has reset;

and ii) a short network address of the wireless communication network that the access point is using after resetting.

Embodiment 40

The apparatus of embodiments 39, wherein the first packet further includes a last used short network address of the wireless communication network that the access point was using prior to resetting.

Embodiment 41

The apparatus of any of embodiments 31-40, wherein the first network interface further comprises: a media access control layer protocol (MAC) processor implemented on the one or more IC devices; and a physical layer protocol (PHY) processor implemented on the one or more IC devices and coupled to the MAC processor.

Embodiment 42

A method, comprising: transmitting, by a first communication device, a wakeup request packet configured to prompt a low-power wakeup radio (LP-WUR) of a second communication device to prompt a network interface device of the second communication device to transition from a low power state to an active state; receiving, by the first communication device, a first packet that includes information configured to prompt the first communication device to transmit data for the second communication device, the first packet having been transmitted by the network interface device of the second communication device in response to the LP-WUR of the second communication device receiving the wakeup request packet; and in response to receiving the first packet, transmitting, by the first communication device, a second packet that includes data for the second communication device.

Embodiment 43

The method of embodiment 42, further comprising: determining, at the first communication device, that the first communication device has data to transmit to the network interface device of the second communication device; wherein transmitting the wakeup request packet is responsive to determining that the first communication device has data to transmit to the network interface device of the second communication device.

Embodiment 44

The method of embodiment 42, further comprising: determining, at the first communication device, that the network interface device of the second communication device is in the low power state; wherein transmitting the wakeup request packet is further responsive to determining that the network interface device of the second communication device is in the low power state.

Embodiment 45

The method of any of embodiments 42-44, wherein: the second packet includes a power save poll (PS-Poll) frame from the network interface device of the second communication device; and the first communication device transmits the second packet in response to the PS-Poll frame.

Embodiment 46

The method of any of embodiments 42-44, wherein: the second packet includes a quality of service null (QoS Null) frame from the network interface device of the second communication device; and the first communication device transmits the second packet in response to the QoS Null frame.

Embodiment 47

An apparatus, comprising: a first network interface device associated with a first communication device, wherein the first network interface device comprises one or more integrated circuit (IC) devices configured to: transmit a wakeup request packet configured to prompt a low-power wakeup radio (LP-WUR) of a second communication device to prompt a second network interface device of the second communication device to transition from a low power state to an active state, receive a first packet that includes information configured to prompt the first network interface device to transmit data for the second communication device, the first packet having been transmitted by the second network interface device of the second communication device in response to the LP-WLR of the second communication device receiving the wakeup request packet, and in response to receiving the first packet, transmit a second packet that includes data for the second communication device.

Embodiment 48

The apparatus of embodiment 47, wherein the one or more IC devices are further configured to: determine that the first network interface device has data to transmit to the second network interface device of the second communication device; wherein the one or more IC devices are configured to transmit the wakeup request packet in response to determining that the first communication device has data to transmit to the second network interface device of the second communication device.

Embodiment 49

The apparatus of embodiment 48, wherein the one or more IC devices are further configured to: determine that the second network interface device of the second communication device is in the low power state; wherein the one or more IC devices are configured to transmit the wakeup request packet further in response to determining that the second network interface device of the second communication device is in the low power state.

Embodiment 50

The apparatus of any of embodiments 47-49, wherein: the second packet includes a power save poll (PS-Poll) frame from the network interface device of the second communication device; and the one or more IC devices are configured to transmit the second packet in response to receiving the PS-Poll frame.

Embodiment 51

The apparatus of any of embodiments 47-49, wherein: the second packet includes a quality of service null (QoS Null) frame from the network interface device of the second communication device; and the one or more IC devices are configured to transmit the second packet in response to receiving the QoS Null frame.

Embodiment 52

The apparatus of any of embodiments 47-51, wherein the first network interface further comprises: a media access control layer protocol (MAC) processor implemented on the one or more IC devices; and a physical layer protocol (PITY) processor implemented on the one or more IC devices and coupled to the MAC processor.

Embodiment 53

A method, comprising: receiving, at a low-power wakeup radio (LP-WUR) of a first communication device, a wakeup request packet configured to prompt the LP-WUR to generate a wakeup signal to prompt a network interface device of the first communication device to transition from a low power state to an active state; in response to receiving the wakeup request packet, generate, at the LP-WUR, the wakeup signal; in response to the wakeup signal, transitioning the network interface device from the low power state to the active state; transmitting, by the network interface device, a first packet that includes information configured to prompt a second communication device to transmit data for the first communication device; and receiving, at the network interface device, a second packet that includes data for the first communication device, the second packet having been transmitted by the second communication device in response to the first packet.

Embodiment 54

The method of embodiment 53 further comprising: generating, at the network interface device, the first packet to include a power save poll (PS-Poll) frame, wherein the PS-Poll frame is configured to prompt the second communication device to transmit data for the first communication device.

Embodiment 55

The method of embodiment 53, further comprising: generating, at the network interface device, the first packet to include a quality of service null (QoS Null) frame, wherein the QoS Null frame is configured to prompt the second communication device to transmit data for the first communication device.

Embodiment 56

The method of embodiment 53, further comprising: generating, at the network interface device, the first packet to include a request to send (RTS) frame, wherein the RTS frame is configured to prompt the second communication device to transmit data for the first communication device.

Embodiment 57

An apparatus, comprising: a low-power wakeup radio (LP-WUR) associated with a first communication device, wherein the LP-WUR is configured to receive a wakeup request packet, and wherein the LP-WUR includes circuitry configured to generate a wakeup signal in response to the LP-WUR receiving the wakeup request packet; and a network interface device associated with a first communication device, the network interface device coupled to the LP-WUR, wherein the first network interface device comprises one or more integrated circuit (IC) devices configured to: in response to the wakeup signal, transition the network interface device from a low power state to the active state, transmit a first packet that includes information configured to prompt a second communication device to transmit data for the first communication device, and receive a second packet that includes data for the first communication device, the second packet having been transmitted by the second communication device in response to the first packet.

Embodiment 58

The apparatus of embodiment 57, wherein the one or more IC devices are configured to: generate the first packet to include a power save poll (PS-Poll) frame, wherein the PS-Poll frame is configured to prompt the second communication device to transmit data for the first communication device.

Embodiment 59

The apparatus of embodiment 57, wherein the one or more IC devices are configured to: generate the first packet to include a quality of service null (QoS Null) frame, wherein the QoS Null frame is configured to prompt the second communication device to transmit data for the first communication device.

Embodiment 60

The apparatus of embodiment 57, wherein the one or more IC devices are configured to: generate the first packet to include a request to send (RTS) frame, wherein the RTS frame is configured to prompt the second communication device to transmit data for the first communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:
1. A method, comprising:
receiving, at an access point (AP), an association request frame from a client station during an association procedure for the client station to join a wireless commu- nication network managed by the AP, the association request including an indication of a time required for a network interface device of the client station to transition from a low power state to an active state to become ready to receive packets;

determining, at the AP, a delay period using the indication included in the association request frame, the delay period corresponding to the time required for the network interface device of the client station to transition from the low power state to the active state to become ready to receive packets;

after receiving the association request frame, transmitting, by the AP, a first packet, wherein the first packet includes a wakeup request packet configured to prompt a wakeup radio at the client station to prompt a network interface device of the client station to transition from the low power state to the active state in which the network interface device is ready to receive a second packet from the AP;

measuring, at the AP, the delay period after an end of transmission of the first packet; and after at least the delay period, transmitting, by the AP, the second packet.

2. The method of claim 1, further comprising:

receiving, at the AP and from the client station, a third packet that corresponds to the association procedure, wherein the third packet is received prior to transmitting the first packet;

wherein the second packet corresponds to the association procedure and is responsive to receiving the third packet.

3. The method of claim 2 wherein:

the third packet includes an authentication request frame; and the second packet includes an authentication response frame.

4. The method of claim 1, wherein:

the first packet includes a type field indicating one or both of i) a type of the second packet, and ii) a type of procedure to which the second packet corresponds.

5. The method of claim 1, wherein:

the first packet includes a network address field; and the method further comprises including in the network address field information that indicates one or both of i) a type of the second packet, and ii) a type of procedure to which the second packet corresponds.

6. The method of claim 1, wherein:

the first packet includes i) information that indicates that the AP has reset; and ii) a short network address of the wireless communication network that the AP is using after resetting.

7. The method of claim 6, wherein the first packet further includes a last used short network address of the wireless communication network that the AP was using prior to resetting.

8. An apparatus, comprising:

a first network interface device associated with an access point (AP), wherein the first network interface device comprises one or more integrated circuit (IC) devices configured to:

receive an association request frame transmitted by a client station during an association procedure for the client station to join a wireless communication network managed by the AP, the association request including an indication of a time required for a second network interface device of the client station to transition from a low power state to an active state to become ready to receive packets, determine a delay period using the indication included in the association request frame, the delay period corresponding to the time required for the second network interface device of the client station to transition from the low power state to the active state to become ready to receive packets, after receiving the association request frame, transmit a first packet that includes a wakeup request packet configured to prompt a wakeup radio at the client station to prompt the second network interface device of the client station to transition from the low power state to the active state in which the second network interface device is ready to receive a second packet from the AP, measure the delay period after an end of transmission of the first packet, and after at least the delay period, transmit the second packet.

9. The apparatus of claim 8, wherein the one or more IC devices are further configured to:

receive, from the client station, a third packet that corresponds to the association procedure, wherein the third packet is received prior to transmitting the first packet;

wherein the second packet corresponds to the association procedure and is responsive to receiving the third packet.

10. The apparatus of claim 9 wherein:

the third packet includes an authentication request frame; and the second packet includes an authentication response frame.

11. The apparatus of claim 8, wherein:

the first packet includes a type field indicating one or both of i) a type of the second packet, and ii) a type of procedure to which the second packet corresponds.

12. The apparatus of claim 8, wherein:

the first packet includes a network address field; and the method further comprises including in the network address field information that indicates one or both of i) a type of the second packet, and ii) a type of procedure to which the second packet corresponds.

13. The apparatus of claim 8, wherein:

the first packet includes i) information that indicates that the AP has reset; and ii) a short network address of the wireless communication network that the AP is using after resetting.

14. The apparatus of claim 13, wherein the first packet further includes a last used short network address of the wireless communication network that the AP was using prior to resetting.

15. The apparatus of claim 8, wherein the first network interface further comprises:

a media access control layer protocol (MAC) processor implemented on the one or more IC devices; and a physical layer protocol (PHY) processor implemented on the one or more IC devices and coupled to the MAC processor.

16. The apparatus of claim 8, wherein the first network interface further comprises:

one or more transceivers.

17. The apparatus of claim 16, further comprising:

one or more antennas coupled to the one or more transceivers.

* * * * *